(12) United States Patent
Muraishi

(10) Patent No.: US 6,529,562 B1
(45) Date of Patent: Mar. 4, 2003

(54) ASK MODULATOR

(75) Inventor: Akihiro Muraishi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/222,868

(22) Filed: Dec. 30, 1998

(30) Foreign Application Priority Data

Apr. 8, 1998 (JP) .......................................... 10-095773

(51) Int. Cl.$^7$ .............................................. H04L 27/04
(52) U.S. Cl. ...................................... 375/300; 332/149
(58) Field of Search ................................ 375/300, 268, 375/298, 219, 260; 455/327

(56) References Cited

U.S. PATENT DOCUMENTS

| | | | | |
|---|---|---|---|---|
| 3,916,353 A | * | 10/1975 | Halberstein | 333/81 R |
| 4,306,311 A | * | 12/1981 | Igarashi | 455/327 |
| 4,434,423 A | * | 2/1984 | Kautz | 343/406 |
| 5,028,890 A | * | 7/1991 | Larson | 332/160 |
| 5,712,876 A | * | 1/1998 | Yoshizawa et al. | 375/268 |
| 5,798,674 A | * | 8/1998 | Fountain | 332/149 |

* cited by examiner

Primary Examiner—Stephen Chin
Assistant Examiner—Kevin Kim
(74) Attorney, Agent, or Firm—Rabin & Berdo, P.C.

(57) ABSTRACT

An ASK modulator which modulates an input signal in accordance with a logic level of the input signal, changes the amplitude of the input signal, and generates an amplitude shift keying (ASK) modulated signal is provided. This ASK modulator has an oscillating means for generating a carrier signal, a frequency filter means which passes a prescribed frequency component of the input signal and outputs a frequency limited signal having the prescribed frequency component, and a modulator which modulates the input signal based on the level of the carrier signal and on the level of the frequency limited signal and outputs the ASK modulated signal having a limited frequency component.

8 Claims, 20 Drawing Sheets

(A)

| CONT | BETWEEN IN AND OUT |
|---|---|
| L (0V) | OFF |
| H (5V) | ON |

(B)

ASK MODULATOR

BACKGROUND OF THE INVENTION

1. Field of the Invention

The present invention relates to ASK (Amplitude Sift Keying) modulators that are suitably applicable to wireless communication systems.

2. Description of Related Art

In performing a wireless data communication, an ASK modulation system in a wireless communication system transmits radio waves only during periods in which the transmission data is at a logic "H" level and halts a radio wave transmission during periods in which the transmission data is at a logic "L" level.

For example, modulation systems of wireless units of ETC (Electronic Toll Collection; non-stop automatic toll collection) systems adopt this system. Here, the ETC system performs a non-stop automatic toll collection at a tollbooth, wireless-communicating between a wireless beacon installed on the road side and an on-vehicle equipment. ETC systems use a high frequency band of 5.8 GHz.

FIG. 1 is a block diagram showing an exemplary configuration of a conventional ASK modulator that is applied to such an ETC system. In what follows, with reference to FIG. 1, the configuration and operation of the conventional ASK modulator will be explained.

As shown in FIG. 1, a 5.8 GHz band wireless carrier signal generated by the local oscillator 1 is amplified by the buffer amplifier 2 and is supplied to the input terminal IN of the gallium arsenic (GaAs) high speed switch 3. On the other hand, a data signal supplied to the data signal input terminal a is sent to the control input terminal CONT of the GaAs high speed switch 3.

FIG. 2 explains the operation characteristic of the GaAs high speed switch 3. In FIG. 2(A), when the data signal supplied to the control terminal CONT is a logic "H" signal, the logic "H" signal is input to the gate of the MOS-FET 302 via the resistor 310. As a result, the region between the drain and source of the MOS-FET 302 is turned on. On the other hand, when a logic "L" signal is input to the MOS-FET 305 via the inverse device 307 and resistor 306, the region between the drain and source of the MOS-FET 305 is turned off. As a result, the 5.8 GHz wireless carrier signal input to the input terminal IN is supplied to the output terminal OUT via the capacitance device 301, MOS-FET 302, and capacitance device 304.

When the data signal supplied to the control terminal CONT is a logic "L" signal, the logic "L" signal is supplied to the gate of the MOS-FET 302. As a result, the region between the drain and source of the MOS-FET 302 is turned off. On the other hand, a logic "H" signal is supplied to the gate of the MOS-FET 305. As a result, the region between the drain and source of the MOS-FET 305 is turned on. Therefore, the 5.8 GHz wireless carrier signal input to the input terminal IN is supplied to the ground GND via the capacitance device 301, MOS-FET 305, and capacitance device 308 in this order but not to the output terminal OUT.

Therefore, as shown in FIG. 2(B), the GaAs high speed switch 3 supplies the 5.8 GHz wireless carrier signal to the power amplification circuit 4 when the data signal sent from the data signal input terminal a is a logic "H" signal. On the other hand, when the data signal sent from the data signal input terminal a is a logic "L" signal, the GaAs high speed switch 3 does not supply the 5.8 GHz wireless carrier signal to the power amplification circuit 4.

By this operation, the GaAs high speed switch 3 outputs an ASK modulation signal in the 5.8 GHz band, that is, a 5.8 GHz band wireless carrier signal that intermittently operates by the same timings as the logic level of the data signal.

The power amplification circuit 4 then amplifies to a prescribed power level the ASK modulation signal in the 5.8 GHz band that has passed through the GaAs high speed switch 3. The band-pass filter 5 shown in FIG. 1 removes spurious radiation components of the ASK modulation signal, which are not needed for communication. The ASK modulation signal is then sent to an antenna not shown in the drawing via the antenna terminal 6 and is emitted as a radio wave.

FIG. 3(A) shows the waveform of the original signal to be supplied to the conventional ASK modulator. FIG. 3(B) shows the waveform of a Manchester signal transformed from the original signal to be supplied to the data signal input terminal of the conventional ASK modulator. FIG. 3(C) shows the waveform of a 5.8 GHz band ASK modulated signal generated by the conventional ASK modulator. In this example of the prior art, the original data signal is transformed into a Manchester data signal so that the clock component of the original data signal can be easily reproduced on the receiver side. The original data signal having the waveform shown in (A) is transformed into a Manchester data signal having the waveform shown in (B). When this data signal shown in (B) is supplied to the data signal input terminal a, the GaAs high speed switch 3 outputs an ASK modulation signal in the 5.8 GHz band shown in (C). This is a 5.8 GHz band wireless carrier signal that intermittently operates with exactly the same timings as the Manchester data signal shown in (B).

However, the above-described conventional ASK modulator has the following problem.

$$10 \times \log_{10}[(\sin^4(\pi f/2 \times 10^6))/(\pi f/2 \times 10^6)^2] \quad (1)$$

The above-provided expression (1) is a general formula of a data signal transformed into a Manchester signal. Data signals transformed into Manchester signals have rectangular waveforms as shown in FIG. 3. The frequency spectrum of such a signal extends to infinity.

In other words, the conventional ASK modulator transforms a data signal having a frequency spectrum that extends to infinity into a 5.8 GHz band wireless carrier signal and obtains an ASK modulated signal by intermittently operating this 5.8 GHz band wireless carrier signal. Therefore, the frequency spectrum of this ASK modulation signal is centered at 5.8 GHz and also spreads to infinity, which is a problem.

A band restricting low pass filter can be inserted into FSK (Frequency Shift Keying) modulators and PSK (Phase Shift Keying) modulators to restrict the frequency band of the data signal as well as the frequency band of the modulated 5.8 GHz band wireless carrier signal.

However, the GaAs high speed switch 3 of the conventional ASK modulator is turned on and off at about an intermediate voltage between the drain voltage and source voltage of the MOS-FET. Therefore, even if a band restricting low pass filter is inserted into the conventional ASK modulator to restrict the frequency band of the data signal, the frequency spectrum of the ASK modulated signal obtained on the output side of the GaAs high speed switch 3 is centered at 5.8 GHz and still spreads to infinity. Therefore, inserting a low pass filter into the conventional ASK modulator does not solve the problem.

For this reason, ASK modulators capable of reducing the frequency band width of the ASK modulation signal are in demand.

SUMMARY OF THE INVENTION

It is an object of the present invention to provide an ASK modulator to solve the problem.

To solve the problem, according to the first embodiment of the present invention, an ASK modulator which modulates an input signal and generates an amplitude shift keying (ASK) modulated signal in accordance with a logic level of the input signal is provided. This ASK modulator has an oscillating means for generating a carrier signal, a frequency filter means which passes a prescribed frequency component of the input signal and outputs a frequency limited signal having the prescribed frequency component, and a modulator which modulates the input signal based on the carrier signal and the frequency limited signal and outputs the ASK modulated signal having a limited frequency component.

According to one aspect of the first embodiment of the present invention, the frequency filter means may be a low pass filter which passes a low frequency component of the input signal.

According to another aspect of the first embodiment of the present invention, the modulator generates the ASK modulated signal having a limited frequency component by changing the amplitude level of the carrier signal so that the amplitude level of the carrier signal will be substantially linearly related with the level of the frequency limited signal.

According to further another aspect of the first embodiment of the present invention, the modulator has a voltage-current conversion means which generates a current signal having a current level that is substantially linearly related with the voltage level of the frequency limited signal such that the modulator generates the ASK modulated signal having a limited frequency component based on the current level of the current signal generated by the voltage-current conversion means.

According to further another aspect of the first embodiment of the present invention, the modulator has a pin diode which changes a resistance level of the pin diode in accordance with the level of a current supplied to the pin diode such that the modulator generates the ASK modulated signal having a limited frequency component based on the resistance level of the pin diode changed by the current level of the current signal that flows through the pin diode.

According to further another aspect of the first embodiment of the present invention, the modulator has a power amplifier which amplifies the amplitude level of the carrier signal to a prescribed level based on the current level of the current signal.

According to further another aspect of the first embodiment of the present invention, the modulator has a double balance mixer which mixes the carrier signal with the frequency limited signal and adjusts the amplitude level of the carrier signal so that the amplitude level of the carrier signal will be substantially linearly related with the level of the frequency limited signal.

According to further another aspect of the first embodiment of the present invention, the double balance mixer has a transformer and a diode.

According to further another aspect of the first embodiment of the present invention, the modulator has a power amplifier which amplifies the amplitude level of the carrier signal to a prescribed level based on the voltage level of the frequency limited signal.

According to further another aspect of the first embodiment of the present invention, the modulator has a negative voltage conversion means which converts the voltage level of the frequency limited signal to a negative level to produce a converted frequency limited signal and supplies the converted frequency limited signal to the power amplifier.

According to further another aspect of the first embodiment of the present invention, the modulator has a power amplification unit which amplifies the carrier signal to a prescribed power level to produce an amplified carrier signal and superposes the amplified carrier signal on the frequency limited signal.

According to further another aspect of the first embodiment of the present invention, the modulator has a superposition power amplifier which amplifies the frequency limited signal to enable the frequency limited signal to be superposed on the carrier signal that has been amplified to the prescribed power level by the power amplification unit.

According to further another aspect of the first embodiment of the present invention, the modulator has a power amplification unit which amplifies the carrier signal to a prescribed power level, a superposition power amplifier which amplifies the frequency limited signal to enable the frequency limited signal to be superposed on the carrier signal that has been amplified to the prescribed power level by the power amplification unit, and a last-stage ASK modulation circuit which generates the ASK modulated signal by superposing the carrier signal amplified by the power amplification unit on the frequency limited signal amplified by the superposition power amplifier.

According to further another aspect of the first embodiment of the present invention, the modulator adjusts said envelope of the carrier signal so that the envelope of the carrier signal will be substantially linearly related with the level of the carrier signal.

According to the second embodiment of the present invention, an ASK modulation method for modulating an input signal and generating an amplitude shift keying (ASK) modulated signal in accordance with a logic level of the input signal is provided. This ASK modulation method has the steps of generating a carrier signal, passing a frequency limited signal having a prescribed frequency component of the input, and modulating the input signal based on the carrier signal and the frequency limited signal to generate the ASK modulated signal having a limited frequency component.

According to one aspect of the second embodiment of the present invention, the passing step has a step of passing a low frequency band of the input signal.

According to another aspect of the second embodiment of the present invention, the modulating step has a step of changing an amplitude level of the carrier signal so that the amplitude level of the carrier signal will be substantially linearly related with the level of the frequency limited signal.

According to the third embodiment of the present invention, an on-vehicle data transmitter for transmitting a data signal used for paying a toll is provided. This data transmitter has a signal processing unit which outputs data to be used for paying the toll, an ASK modulator which generates an amplitude shift keying (ASK) modulated signal in accordance with the logic level of the data signal, and an antenna for transmitting the ASK modulated signal modulated by the ASK modulator. This ASK modulator has an oscillating means for generating a carrier signal, a low pass filtering means which outputs a frequency limited signal having a prescribed low frequency component of the input signal, and a modulator which modulates the input signal based on the carrier signal and the frequency limited signal and outputs the ASK modulated signal having a limited frequency component.

According to one aspect of the third embodiment of the present invention, the modulator generates the ASK modulated signal having a limited frequency component by changing the amplitude level of the carrier signal so that the amplitude level of the carrier signal will be substantially linearly related with the level of the frequency limited signal.

According to the fourth embodiment of the present invention, a wireless beacon for transmitting and receiving a data signal is provided. This wireless beacon has a signal processing unit for processing a transmission data signal, an ASK modulator for generating an ASK modulated data signal in accordance with the logic level of the transmission data signal, and an antenna for transmitting to a communication partner the transmission data signal ASK modulated by the ASK modulator.

Moreover, in order to solve the problem, according to another embodiment of the present invention, an ASK modulator, which has an oscillation means for generating a carrier signal, for generating an ASK modulated signal whose amplitude has been changed in accordance with the logic level of the input signal is provided. This ASK modulator has (1) a frequency filter means which passes only a prescribed frequency component of the input signal and outputs a frequency limited signal having a prescribed frequency component, and (2) a modulator which adjusts the envelope of the carrier signal supplied from the oscillating means so that the envelope of the carrier signal will be substantially linearly related with the level of the frequency limited signal supplied from the frequency filter means.

According to an embodiment of the present invention, the envelope of the carrier signal is changed so that it will be linearly related to a level of the frequency limited signal obtained from the input signal by passing only a low frequency component of the input signal. Thus, the spread of the frequency band of the ASK modulated signal is confined within a frequency band determined by the filter means.

According to another embodiment of the present invention, an ASK modulator, which has an oscillation means for generating a carrier signal, for generating an ASK modulated signal whose amplitude has been changed in accordance with the logic level of the input signal is provided.

This ASK modulator has (1) a frequency filter means which passes only a prescribed frequency band of the input signal and outputs a frequency limited signal having a prescribed frequency component, and (2) a power amplification modulator which changes the envelope of the carrier signal so that it will be linearly related to the level of the frequency limited signal by amplifying the carrier signal to a prescribed power level while changing the amplification factor in accordance with the level of the frequency limited signal supplied from the frequency filter means.

According to this embodiment of the present invention, by changing the envelope of the carrier signal so that it will be linearly related to the level of the frequency limited signal by amplifying the carrier signal to a prescribed power level while changing the amplification factor in accordance with the level of the frequency limited signal supplied from the frequency filter means that has passed only the low frequency band of the input signal, the spread of the frequency band of the ASK modulated signal is confined within a frequency band determined the filter means.

According to further another embodiment of the present invention, an ASK modulator, which has an oscillation means for generating a carrier signal and a power amplifier for amplifying this carrier signal to a prescribed power level, for generating an ASK modulated signal whose amplitude has been changed in accordance with the logic level of the input signal is provided.

This ASK modulator has a (1) a frequency filter means which passes only a prescribed frequency band of the input signal and outputs a frequency limited signal having a prescribed frequency component, (2) superposition power amplifier which amplifies the power level of the frequency limited signal supplied from the frequency filter means to a level at which the frequency limited signal can be superposed on another signal, and (3) a superposition modulator, which is installed at the last stage of the power amplifier, for changing the envelope of the carrier signal so that it will be linearly related to the level of the frequency limited signal by superposing the frequency limited signal supplied from the power amplifier onto the carrier signal supplied from the superposition power amplifier.

According to this embodiment of the present invention, the envelope of the carrier signal is changed so that it will be linearly related to the level of the frequency limited signal by superposing the frequency limited signal onto the carrier signal. As a result, the spread of the frequency band of the ASK modulated signal is confined within a frequency band determined the filter means.

The outline of the above-described invention does not list all the required characteristics of the present invention. Sub-combinations of these characteristics group are also covered by the scope of the present invention.

DETAILED DESCRIPTION OF THE INVENTION

The present invention will be explained through its embodiments. However, the following embodiments do not limit the scope of the present invention described in the claims. Moreover, not all the combinations of the characteristics described in the embodiments are necessarily essential for solving the present invention.

(A) FIRST EMBODIMENT

Figure 1:
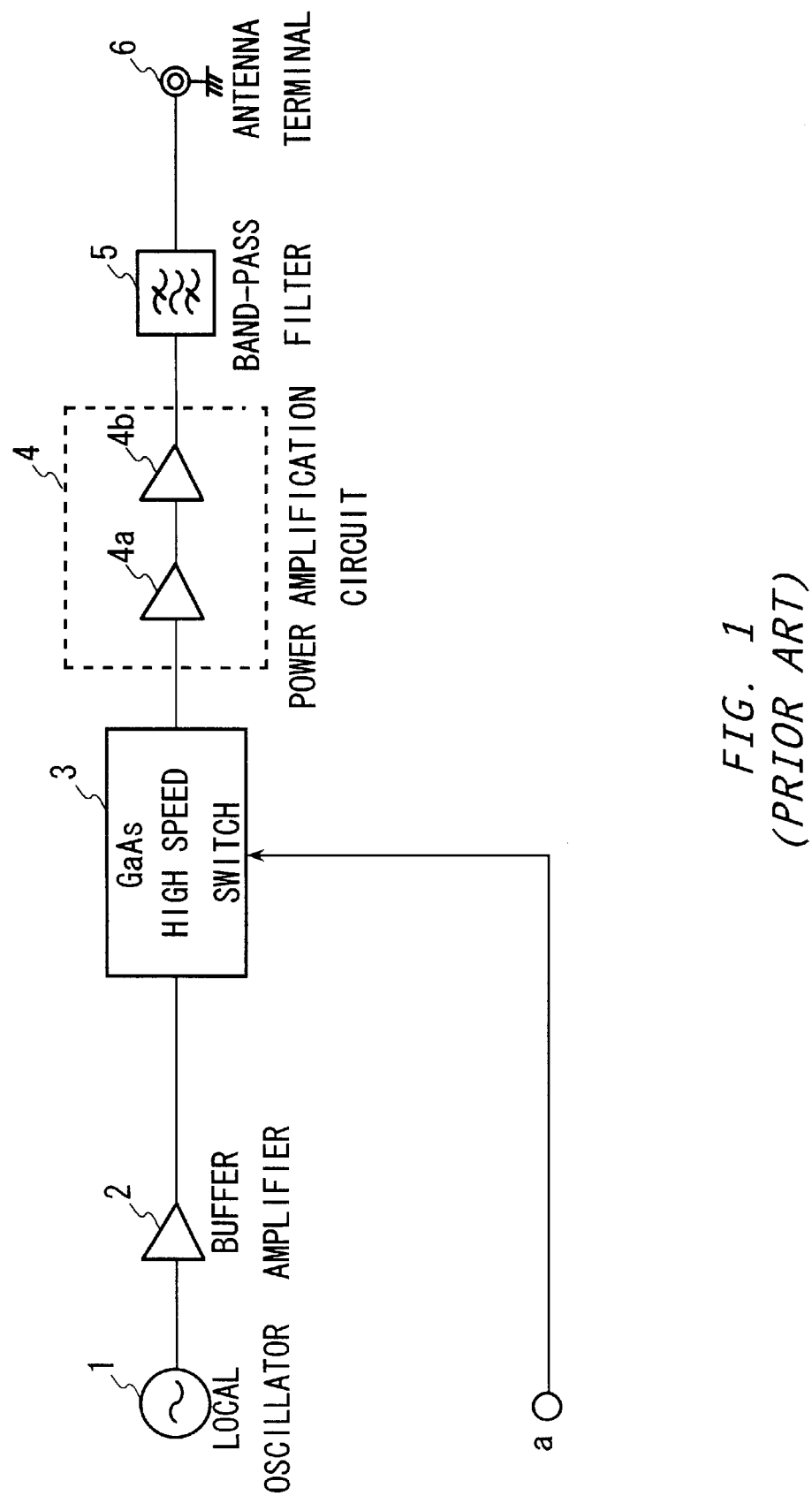
FIG. 1 is a block diagram showing an exemplary configuration of a conventional ASK modulator.
Figure 2:
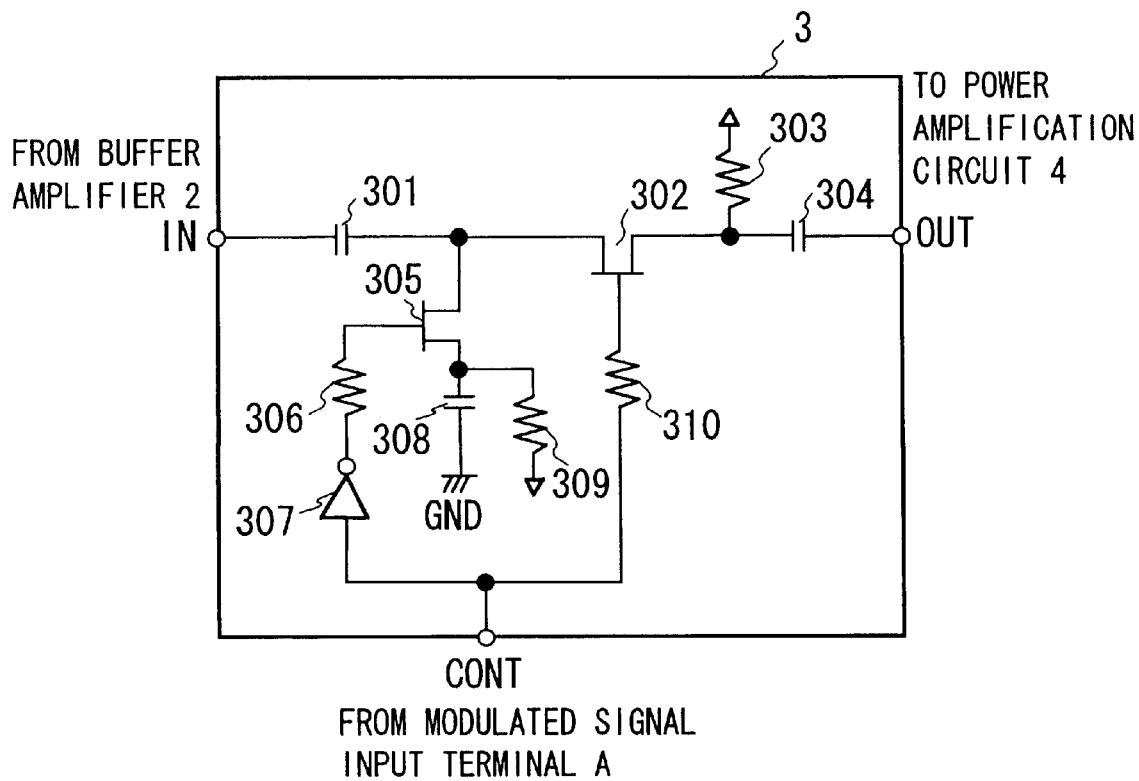
FIG. 2 explains the operation characteristic of the GaAs high speed switch 3.
Figure 3:
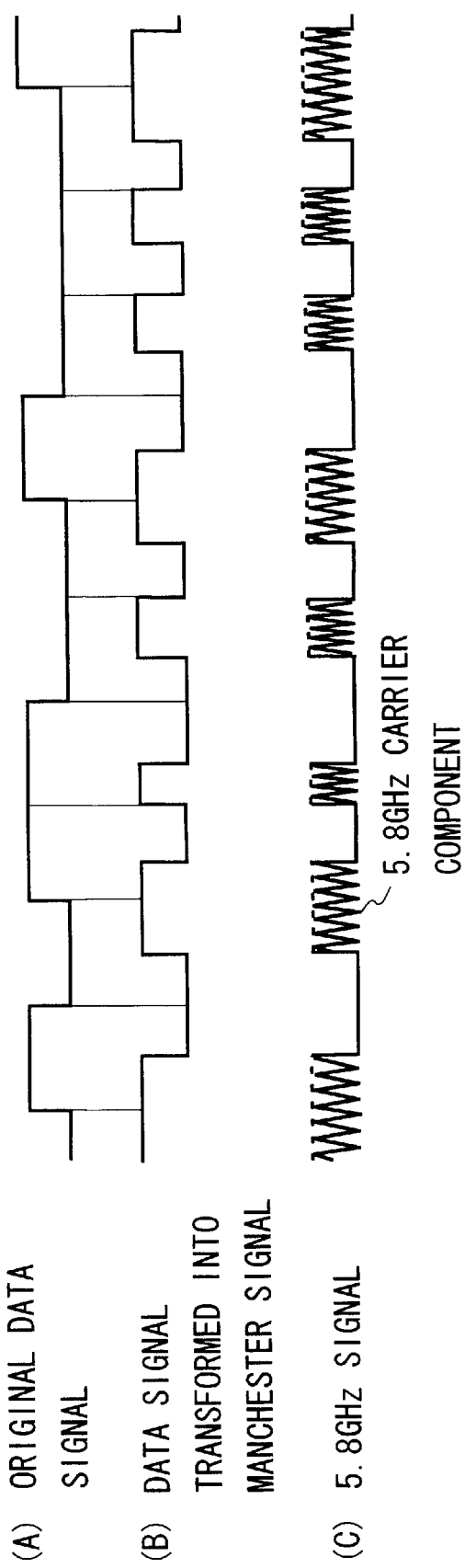
FIG. 3(A) shows the waveform of the original signal to be supplied to the conventional ASK modulator.
FIG. 3(B) shows the waveform of a Manchester signal transformed from the original signal to be supplied to the data signal input terminal of the conventional ASK modulator.
FIG. 3(C) shows the waveform of a 5.8 GHz band ASK modulated signal generated by the conventional ASK modulator.
Figure 4:
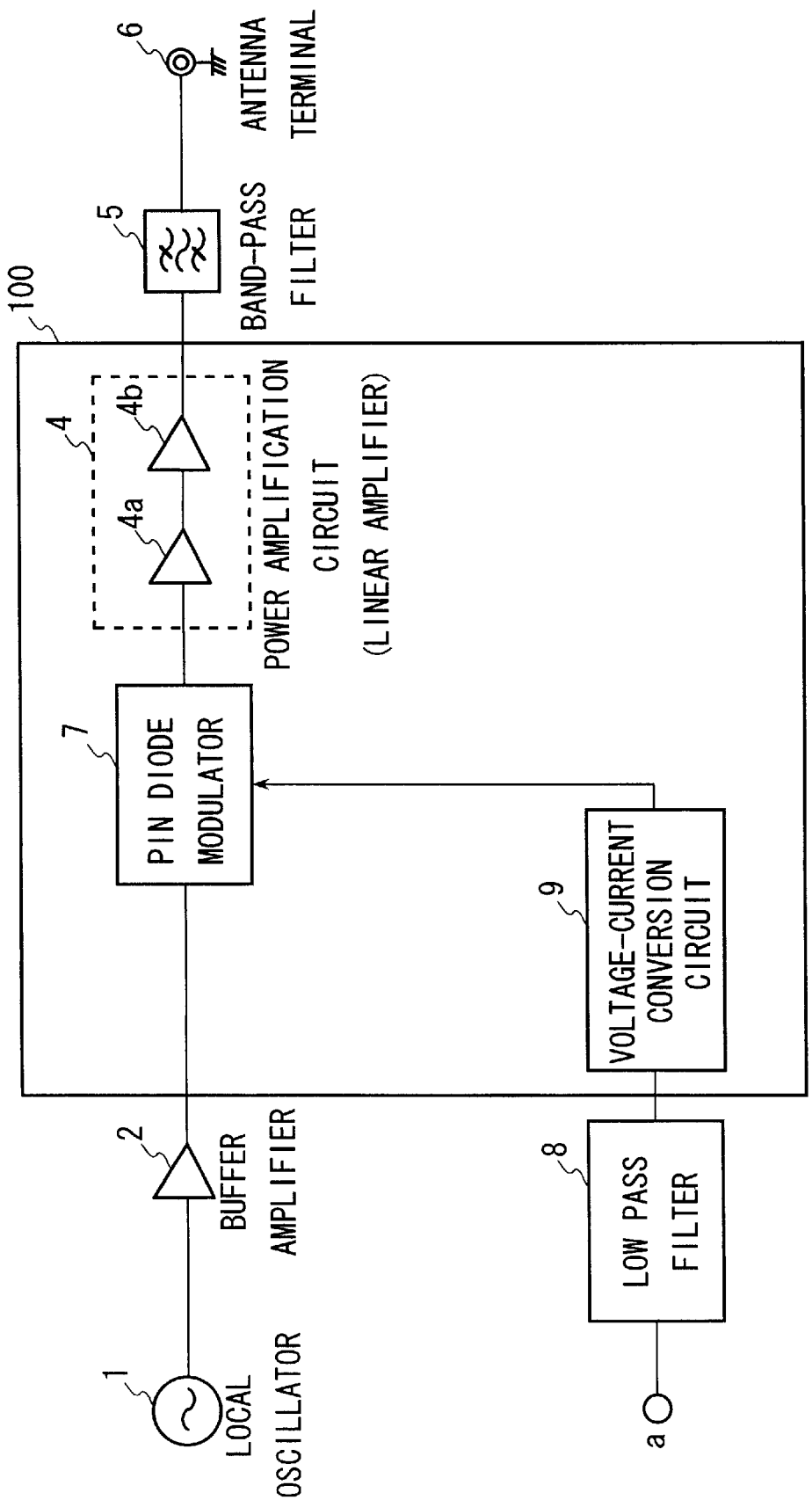
FIG. 4 is a block diagram showing the configuration of the first embodiment of the present invention.
Figure 5:
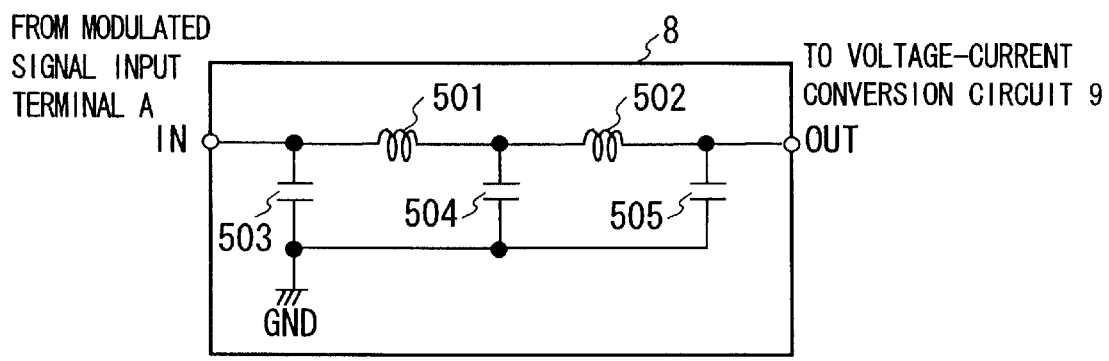
FIG. 5 is a block diagram showing a detailed exemplary configuration of the low pass filter 8.
Figure 6:
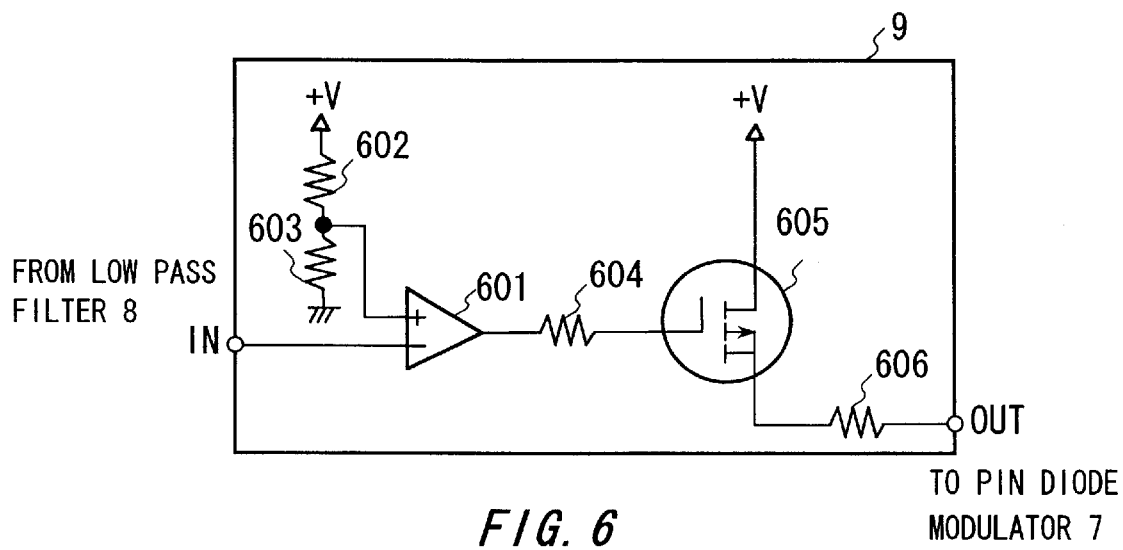
FIG. 6 is a block diagram showing a detailed exemplary configuration of the voltage-current conversion circuit 9.
Figure 7:
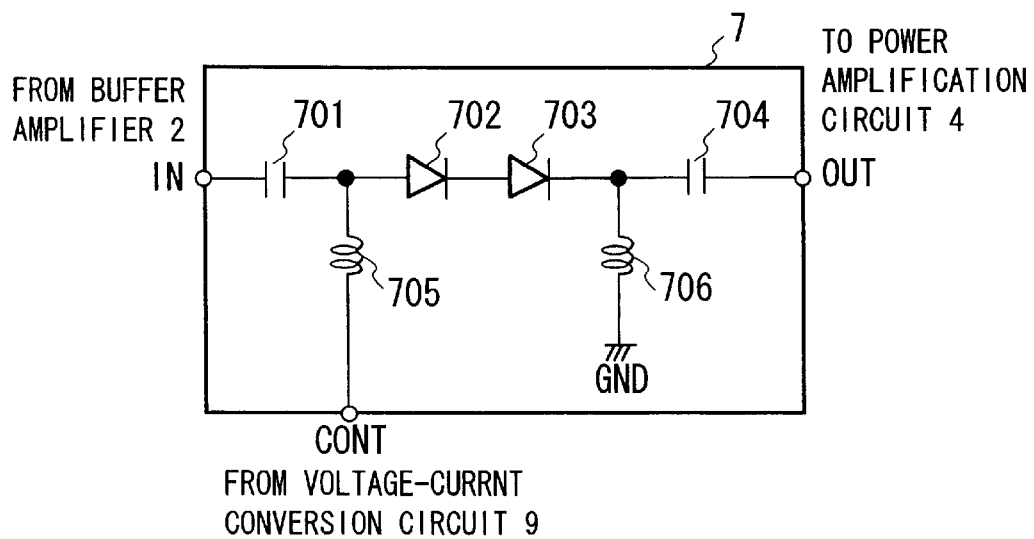
FIG. 7 is a block diagram showing a detailed exemplary configuration of the pin diode modulator 7 according to the first embodiment.
Figure 8:
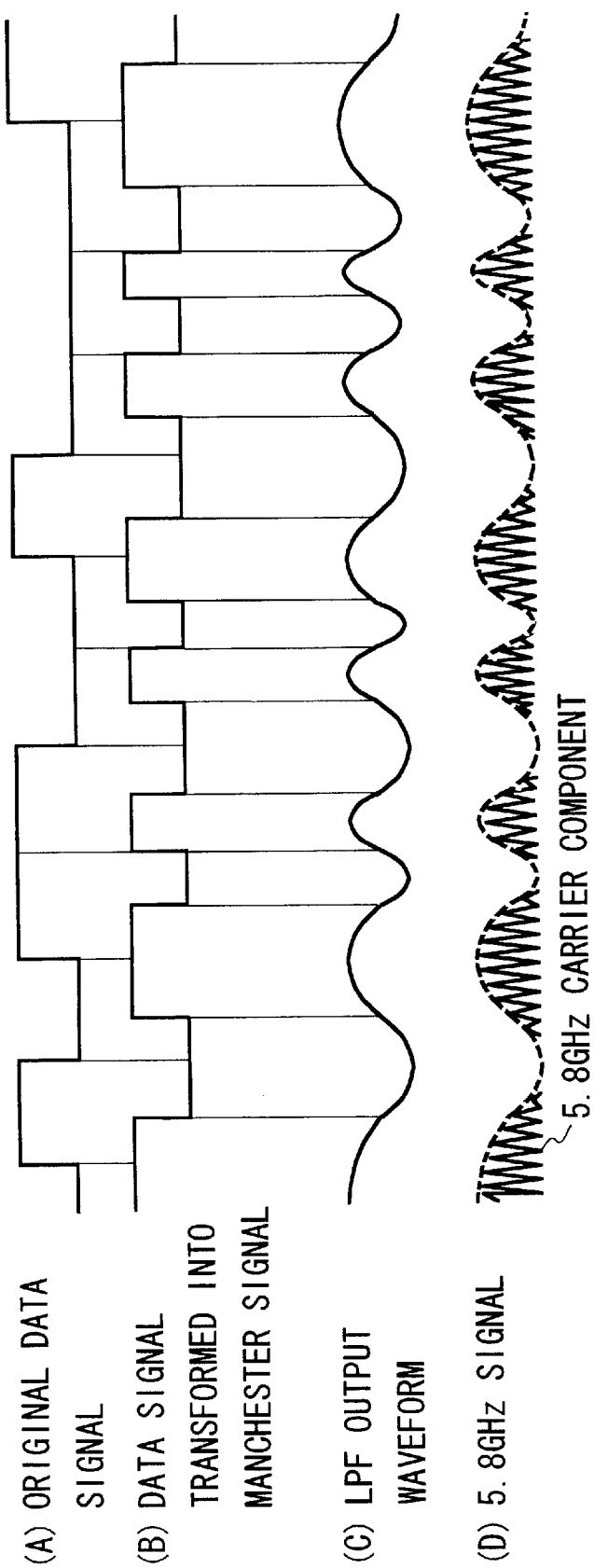
FIG. 8(A) shows the waveform of the original transmission data signal to be supplied to the ASK modulator according to the first embodiment.
FIG. 8(B) shows the waveform of a Manchester signal transformed from the original transmission data signal to be supplied to the data signal input terminal of the ASK modulator according to the first embodiment.
FIG. 8(C) shows the waveform of the transmission data signal smoothed by the low pass filter of the ASK modulator according to the first embodiment.
FIG. 8(D) shows the waveform of a 5.8 GHz band ASK modulated signal generated by the ASK modulator according to the first embodiment.

In what follows, the first embodiment of the present invention in which an ASK modulator according to the present invention is applied to a wireless communication system in the wireless frequency 5.8 GHz band will be explained in detail with reference to the attached drawings. FIG. 4 is a block diagram showing the configuration of the first embodiment. FIGS. 5 through 7 are block diagrams showing in detail the structures of the constitutive components of the first embodiment. FIG. 8 shows signal waveforms generated by these constitutive components.

In FIG. 4, this ASK modulator of the first embodiment has a local oscillator 1, a buffer amplifier 2, a power amplification circuit 4, a band-pass filter 5, an antenna terminal 6, a pin diode modulator 7, a low pass filter 8, and a voltage-current conversion circuit 9. The power amplification circuit 4, pin diode modulator 7, and voltage-current conversion circuit 9 form a modulation means 100.

The local oscillator 1 generates a 5.8 GHz band wireless carrier signal for transmitting a data signal as transmission data and supplies the 5.8 GHz band wireless carrier signal to the buffer amplifier 2. The buffer amplifier 2 receives the 5.8 GHz band wireless carrier signal from the local oscillator 1, amplifies the 5.8 GHz band wireless carrier signal, and supplies the amplified 5.8 GHz band wireless carrier signal to the pin diode modulator 7.

The low pass filter 8 receives a data signal from the data signal input terminal a, removes high frequency components from the data signal, and supplies the resultant data signal to the voltage-current conversion circuit 9. The cutoff frequency of the low pass filter 8 determines the frequency band width of the ASK modulated data signal obtained on the output side of the pin diode modulator 7. The low pass filter 8 is used in the present embodiment as a frequency filter for limiting the frequency components of the data signal. However, a band pass filter or the like may be used instead. Therefore, the frequency filter means of the present invention includes a low pass filter and a band pass filter.

FIG. 5 shows in detail an exemplary structure of this low pass filter 8. In FIG. 5, one end of the inductance device 501 is connected to the input terminal IN and the other end of the inductance device 501 is connected to one end of the inductance device 502. The other end of the inductance device 502 is connected to the output terminal OUT. One end of the first capacitance device 503 is connected to the connection node of the input terminal IN and first inductance device 501, and the other end of the capacitance device 503 is connected to the ground GND. One end of the second capacitance device 504 is connected to the connection node of the inductance devices 501 and 502, and the other end of the capacitance device 504 is connected to the ground GND. One end of the third capacitance device 505 is connected to the connection node of the inductance device 502 and output terminal OUT, and the other end of the capacitance device 505 is connected to the ground GND.

These inductance devices 501 and 502 and capacitance devices 503, 504, and 505 remove high frequency components from the signal supplied to the input terminal IN and send the resultant signal to the output terminal OUT. Thus, the low pass filter 8 removes high frequency components from the data signal supplied to the input terminal IN from the data signal input terminal a, sends the resultant signal to the output terminal OUT and then to the voltage-current conversion circuit 9.

The voltage-current conversion circuit 9 receives the data signal from the low pass filter 8, converts the data signal into a current signal whose current level is linearly related to the voltage level of this data signal, and supplies the converted data signal to the pin diode modulator 7.

FIG. 6 shows in detail the structure of this voltage-current conversion circuit 9. In FIG. 6, the inversion input terminal of the operation amplifier 601, the output terminal of the operation amplifier 601, the resistor 604, the gate of the unipolar FET 605, the source of the unipolar FET 605, and the resistor 606 are serially connected in this order from the input terminal IN to the output terminal OUT. The resistors 602 and 603 are serially connected in this order from the positive power source +V to the ground GND. The connection node of the resistors 602 and 603 is connected to the non-inversion input terminal of the operation amplifier 601. The drain of the unipolar FET 605 is connected to the positive power source +V.

The voltage level at the connection node of the resistors 602 and 603 becomes an intermediate voltage level of the dynamic range of the data signal supplied to the input terminal IN.

The operation amplifier 601 inverts and amplifies the signal supplied to the input terminal IN with respect to the level of the voltage applied to the non-inversion input terminal, and supplies the inverted and amplified signal to the unipolar FET 605 via the resistor 604.

The resistor 604 protects the unipolar FET 605 against a rush current that is based on a signal supplied from the operation amplifier 601.

The unipolar FET 605 amplifies to a level the signal supplied from the resistor 604 to its gate so as to produce an inverted and amplified current level on the source side, and supplies the obtained current level to the output terminal OUT via the resistor 606.

Therefore, in the voltage-current conversion circuit 9, the operation amplifier 601 inverts and amplifies the data signal, which is supplied from the low pass filter 8 to the input terminal IN, with respect to the intermediate voltage level of the dynamic range of the data signal. The unipolar FET 605 then converts the inverted and amplified data signal into an inverted and amplified current level and supplies the obtained current level to the output terminal OUT via the resistor 606. The voltage-current conversion circuit 9 then sends the converted data signal to the pin diode modulator 7.

As a result of this operation, the output terminal of the voltage-current conversion circuit 9 produces a data signal whose current level is linearly related to the voltage level of the data signal supplied to the input terminal IN.

The pin diode modulator 7 generates a 5.8 GHz band wireless carrier signal having an amplitude level that corresponds to the current level of the data signal supplied from the voltage-current conversion circuit 9, and sends the 5.8 GHz band wireless carrier signal to the power amplification circuit 4.

FIG. 7 shows in detail an exemplary configuration of this pin diode modulator 7. In FIG. 7, the first capacitance device 701, first pin diode 702, second pin diode 703, and second capacitance device 704 are serially connected between the input terminal IN and output terminal OUT in this order from the input terminal IN to the output terminal OUT. The first inductance device 705 is connected between the connection node of the capacitance device 701 and pin diode 702 and the control terminal CONT. The second inductance device 706 is connected between the connection node of the capacitance device 704 and pin diode 703 and the ground GND.

The capacitance devices 701 and 704 remove the direct current component of the signal supplied to the input terminal, and supplies only the alternate current component to the output terminal OUT. Moreover, the capacitance devices 701 and 704 prevent a signal current supplied to the control terminal CONT from flowing into the input terminal IN and output terminal OUT.

The inductance device 705 removes unwanted high frequency components (noises) from the signal supplied to the control terminal CONT. In addition, the inductance device 705 sends the current of the signal supplied to the control terminal CONT to the ground via the pin diodes 702 and 703 and the inductance device 706.

The inductance device 706 removes unwanted high frequency components (noises) from the signal transmitted from the pin diode 703. In addition, the inductance device 706 passes the current of the signal, which is supplied to the control terminal CONT and flows through the pin diodes 702 and 703, to the ground GND in this order.

The pin diodes 702 and 703 change their internal resistance levels in accordance with the level of the current that flows forward through the pin diodes 702 and 703 in this order. The pin diodes 702 and 703 damp the amplitude of the 5.8 GHz band wireless carrier signal, which is sent from the input terminal IN, in accordance with these internal resistance levels, and supplies the damped 5.8 GHz band wireless carrier signal to the output terminal OUT.

Therefore, the pin diodes 702 and 703 of the pin diode modulator 7 damp the 5.8 GHz band wireless carrier signal, which is input to the input terminal IN and sent from the buffer amplifier 2, in accordance with the current level of the data signal supplied to the control terminal CONT from the voltage-current conversion circuit 9. The damped 5.8 GHz band wireless carrier signal is then output from the output terminal OUT to the power amplification circuit 4.

By this operation, the pin diode modulator 7 produces a 5.8 GHz band wireless carrier signal having an amplitude level that corresponds to the current level of the data signal supplied from the voltage-current conversion circuit 9, that is, an ASK modulated signal in the 5.8 GHz band.

The power amplification circuit 4 amplifies the ASK modulated signal, which is sent from the pin diode modulator 7, to a prescribed power level, and feeds the amplified ASK modulated signal to the band-pass filter 5. This power amplification circuit 4 contains, for example, two linear amplifiers 4a and 4b which linearly amplify the power level of the input ASK modulated signal.

The band-pass filter 5 removes unwanted spurious radiation components from the ASK modulated signal output from the power amplification circuit 4, and feeds the resultant ASK modulated signal to the antenna terminal 6. The ASK modulated signal is then sent from the antenna terminal 6 to an antenna not shown in the drawing and is radiated as a radio wave.

Next, the operation of this ASK modulator according to the first embodiment will be explained in detail with reference to the signal waveform diagrams shown in FIG. 8.

The transmission data signal shown in FIG. 8(A) is first transformed into the Manchester data signal shown in FIG. 8(B). This Manchester data signal is supplied to the low pass filter 8 via the data signal input terminal a. The low pass filter 8 then smoothes the edges of the Manchester data signal to produce a smooth waveform as shown in FIG. 8(C), and sends the smoothed signal to the voltage-current conversion circuit 9. The voltage-current conversion circuit 9 converts the smoothed data signal into a data signal whose current level is linearly related to the voltage level of this data signal, and sends the converted data signal to the pin diode modulator 7.

The pin diode modulator 7 produces a 5.8 GHz band wireless carrier signal having an amplitude level that corresponds to the current level of the data signal supplied from the voltage-current conversion circuit 9, that is, an ASK modulated signal in the 5.8 GHz band shown in FIG. 8(D). This ASK modulated signal is then sent to the power amplification circuit 4.

The band-pass filter 5 removes unwanted spurious radiation components from the ASK modulated signal output from the pin diode modulator 7, and feeds the resultant ASK modulated signal to the antenna terminal 6. The ASK modulated signal is then sent from the antenna terminal 6 to the antenna not shown in the drawing and is radiated as a radio wave.

Thus, a low pass filter for removing high frequency components from the given data signal, a voltage-current conversion circuit which converts the data signal input from the low pass filter into a data signal whose current level is linearly related to the voltage level of this input data signal, and a pin diode modulator which damps the 5.8 GHz band wireless carrier signal in accordance with the current level of the data signal supplied from the voltage-current conversion circuit are installed in the ASK modulator according to the above-described first embodiment. As a result, the spread of the frequency spectrum of the ASK modulated signal centered at 5.8 GHz is confined within a range determined by the cut-off characteristics of the band limiting low pass filter. Hence, the frequency band width of the ASK modulated signal is reduced.

(B) SECOND EMBODIMENT

Figure 9:
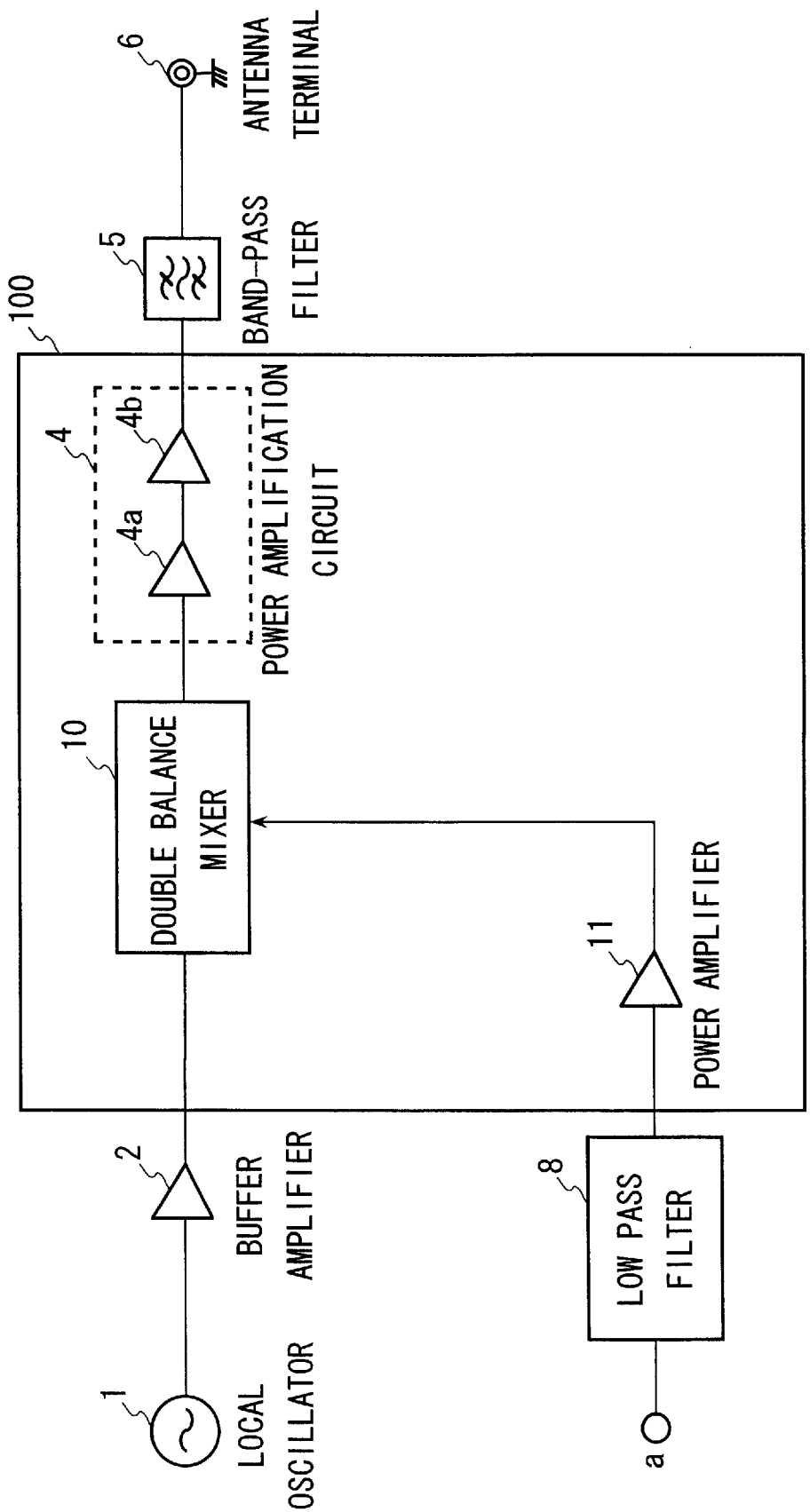
FIG. 9 is a block diagram showing the configuration of the second embodiment of the present invention.
Figure 10:
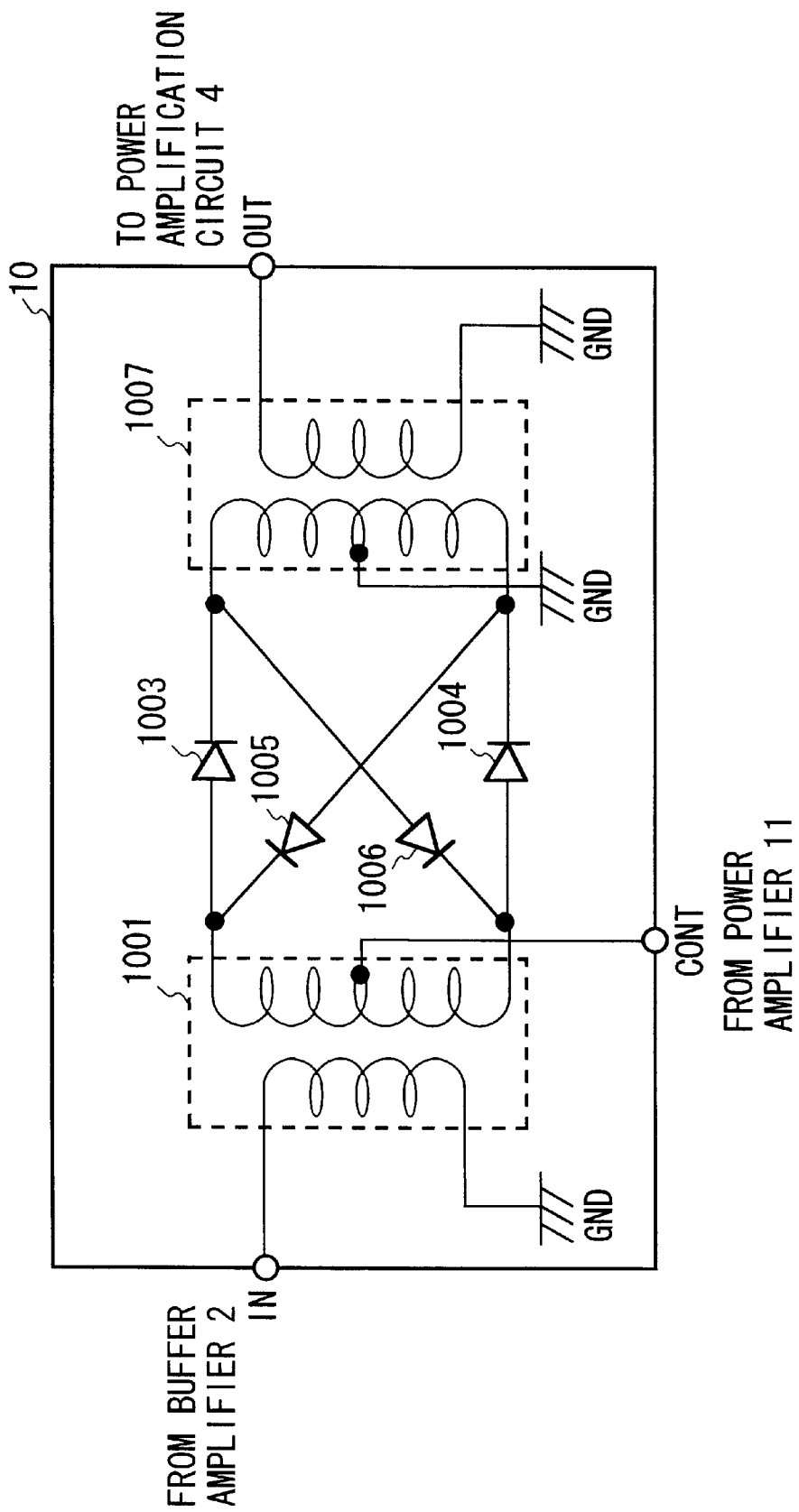
FIG. 10 is a block diagram showing a detailed exemplary configuration of the double balance mixer 10.

In what follows, the second embodiment of the present invention in which an ASK modulator according to the present invention is applied to a wireless communication system in the wireless frequency 5.8 GHz band will be explained with reference to the attached drawings. Here, FIG. 9 is a block diagram showing the configuration of this second embodiment. FIG. 10 shows in detail an exemplary configuration of this double balance mixer 10.

The ASK modulator of the second embodiment shown in FIG. 9 has a local oscillator 1, a buffer amplifier 2, a power amplification circuit 4, a band-pass filter 5, an antenna terminal 6, a low pass filter 8, a double balance mixer 10, and a power amplifier 11. The power amplification circuit 4, double balance mixer 10, and a power amplifier 11 form a modulation means 100.

This second embodiment differs from the first embodiment in that the double balance mixer 10 is adopted in place of the pin diode modulator 7.

In FIG. 9, the same reference numerals are assigned to the same components used in the first embodiment. Such components will not be explained here. Hence, only the double balance mixer 10 and power amplifier 11 will be explained in the following.

The double balance mixer 10 is not activated by driving the voltage of the data signal supplied from the low pass filter 8. Hence, the power amplifier 11 is installed to drive the power of the data signal supplied from the low pass filter 8 and to feed the amplified data signal to the double balance mixer 10.

The double balance mixer 10 generates a 5.8 GHz band wireless carrier signal whose amplitude corresponds to the power level of the data signal supplied from the power amplifier 11 and supplies the 5.8 GHz band wireless carrier signal to the power amplification circuit 4.

FIG. 10 shows in detail an exemplary configuration of this double balance mixer 10. In FIG. 10, the input terminal IN is connected to one of the input terminal pair of the transformer 1001. The other of the input terminal pair of the transformer 1001 is connected to the ground GND. One of the output terminal pair of the transformer 1001 is connected to one of the input terminal pair of the transformer 1007 via the anode and cathode of the diode 1003. The other of the output terminal pair of the transformer 1001 is connected to the other of the input terminal pair of the transformer 1007 via the anode and cathode of the diode 1004. The other of the output terminal pair of the transformer 1007 is connected to the ground GND. The cathode of the diode 1003 is connected to the anode of the diode 1004 via the anode and cathode of the diode 1006. The cathode of the diode 1004 is connected to the anode of the diode 1003 via the anode and cathode of the diode 1005. The transformer 1001 has a tap terminal as a balancer on its output side. This tap terminal is connected to the control terminal CONT. The transformer 1007 has a tap terminal as a balancer on its input side. This tap terminal is connected to the ground GND.

When the voltage level of a signal supplied to the tap terminal of the transformer 1001 from the control terminal CONT is higher than the level of the voltage applied to the tap terminal of the transformer 1007, a forward voltage is applied to the diodes 1003 and 1004, and a backward voltage is applied to the diodes 1005 and 1006. As a result, the signal supplied to the input terminal IN is sent to the output terminal OUT in accordance with the power level of the signal supplied from the control terminal CONT.

On the other hand, when the voltage level of the signal supplied to the tap terminal of the transformer 1001 from the control terminal CONT is lower than the level of the voltage applied to the tap terminal of the transformer 1007, a backward voltage is applied to the diodes 1003 and 1004, and a forward voltage is applied to the diodes 1005 and 1006. As a result, the signal supplied to the input terminal IN is inverted and sent to the output terminal OUT in accordance with the power level of the signal supplied from the control terminal CONT.

Hence, this double balance mixer 10 outputs the 5.8 GHz band wireless carrier signal, which has been supplied to the input terminal IN from the buffer amplifier 2, to the output terminal OUT in accordance with the power level of the signal supplied to the control terminal CONT, and sends the 5.8 GHz band wireless carrier signal to the power amplification circuit 4.

By this operation, the double balance mixer 10 outputs a 5.8 GHz band wireless carrier signal whose amplitude level corresponds to the power level of the signal supplied from the power amplifier 11, that is, an ASK modulated signal in the 5.8 GHz band.

Next, the operation of this ASK modulator according to the second embodiment will be explained in detail. Since the signal waveforms obtained in this case are the same as those obtained in the first embodiment, they will not be shown.

When a data signal, which has been transformed into a Manchester data signal from the original transmission data, is supplied to the low pass filter 8 via the data input terminal a, the low pass filter 8 smoothes the edge portion of the data signal by removing the high frequency components of the data signal, and supplies the smoothed data signal to the power amplifier 11. The power amplifier 11 then drives the power level of the received data signal and sends the data signal to the double balance mixer 10.

The double balance mixer 10 produces a 5.8 GHz band wireless carrier signal whose amplitude level corresponds to the power level of the signal supplied from the power amplifier 11, that is, an ASK modulated signal in the 5.8 GHz band as shown in FIG. 8(D). The double balance mixer 10 then outputs this ASK modulated signal to the power amplification circuit 4.

The band-pass filter 5 removes unwanted spurious radiation components from the ASK modulated signal output from the double balance mixer 10, and feeds the resultant ASK modulated signal to the antenna terminal 6. The ASK modulated signal is then sent from the antenna terminal 6 to the antenna not shown in the drawing and is radiated as a radio wave.

Thus, according to the second embodiment, a low pass filter for removing high frequency components from the given data signal, a power amplifier which drives the power level of the data signal supplied from the low pass filter, and a double balance mixer 10 that produces a 5.8 GHz band wireless carrier signal whose amplitude level corresponds to the power level of the signal supplied from the power amplifier are installed in the ASK modulator according to the above-described second embodiment. As a result, the spread of the frequency spectrum of the ASK modulated signal centered at 5.8 GHz is confined within a range determined by the cut-off characteristics of the band limiting low pass filter. Hence, the frequency band width of the ASK modulated signal is reduced.

(C) THIRD EMBODIMENT

Figure 11:
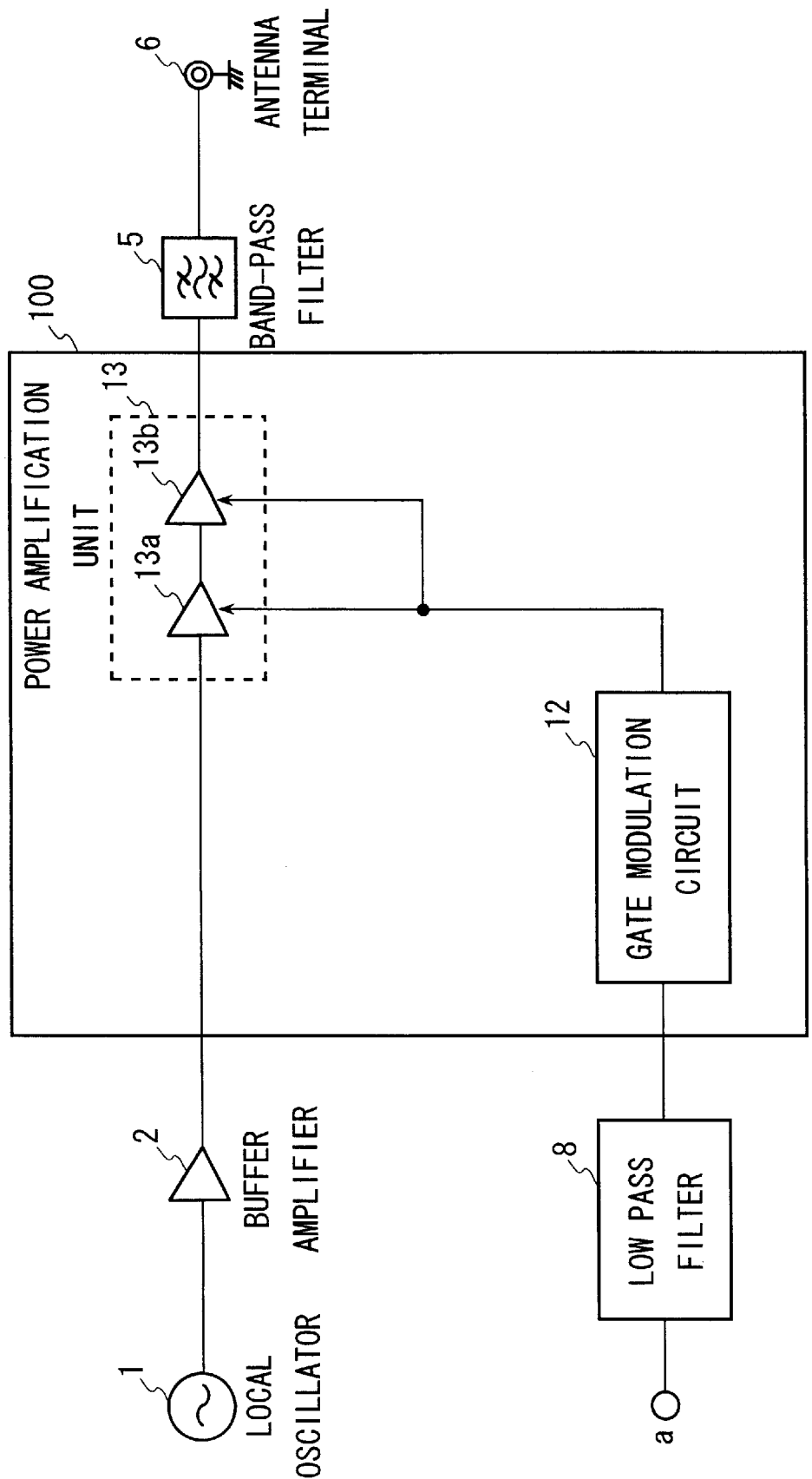
FIG. 11 is a block diagram showing the configuration of the third embodiment of the present invention.
Figure 12:
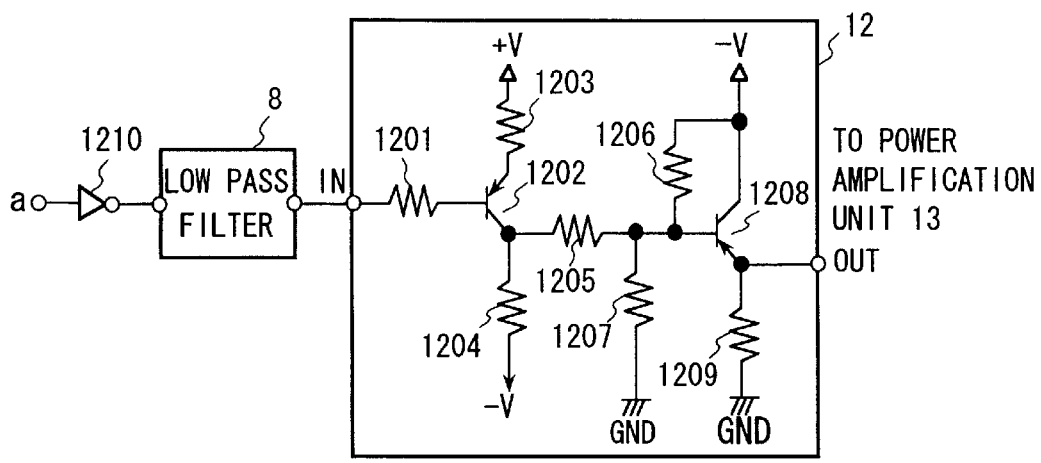
FIG. 12 is a block diagram showing a detailed first exemplary configuration of the gate modulation circuit 12.
Figure 13:
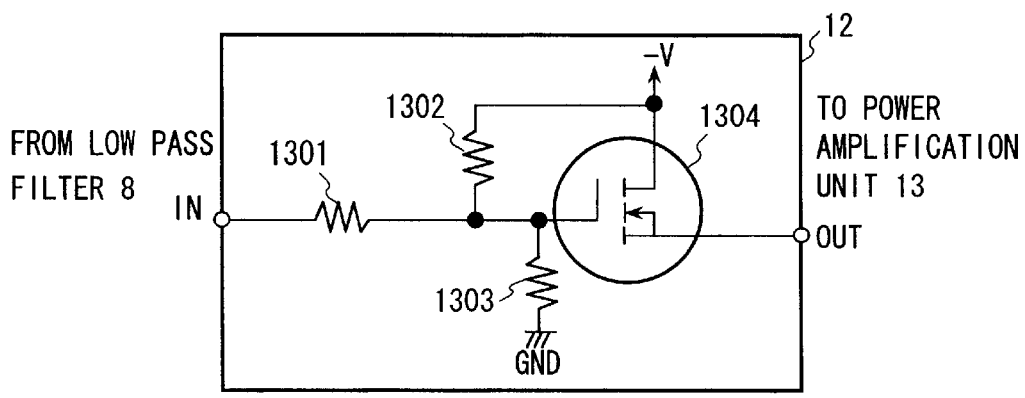
FIG. 13 is a block diagram showing a detailed second exemplary configuration of the gate modulation circuit 12.
Figure 14:
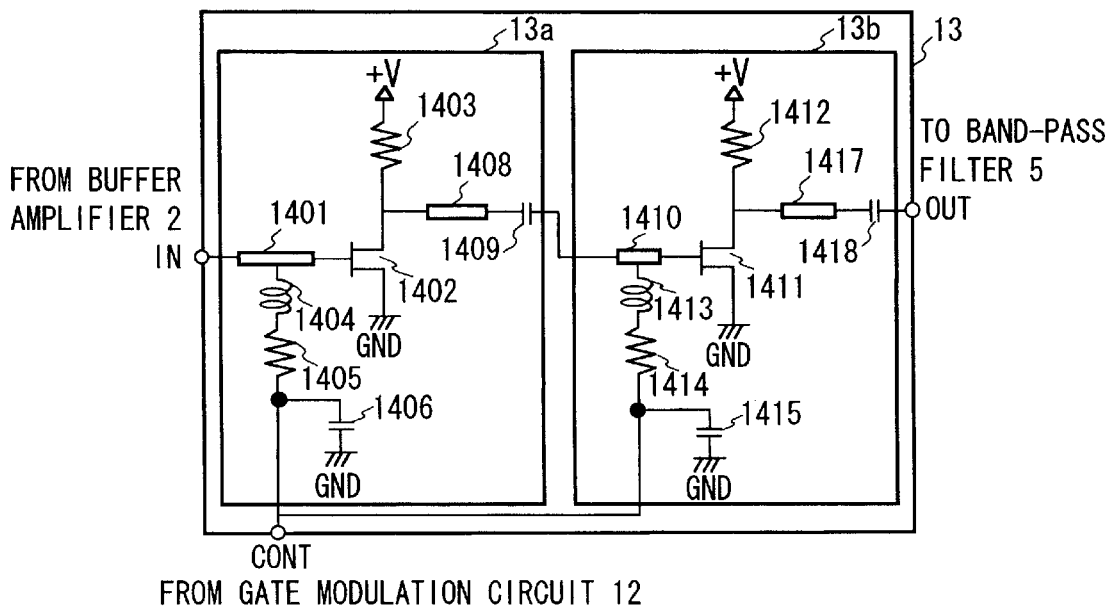
FIG. 14 is a block diagram showing a detailed exemplary configuration of the power amplification unit 13.

In what follows, the third embodiment of the present invention in which an ASK modulator according to the present invention is applied to a wireless communication system in the wireless frequency 5.8 GHz band will be explained in detail with reference to the attached drawings. Here, FIG. 11 is a block diagram showing the configuration of this third embodiment. FIGS. 12 through 14 show in detail configurations of key components used in this embodiment.

The ASK modulator of the third embodiment shown in FIG. 11 has a local oscillator 1, a buffer amplifier 2, a band-pass filter 5, an antenna terminal 6, a low pass filter 8, a gate modulation circuit 12, and a power amplification unit 13. The gate modulation circuit 12 and power amplification unit 13 form a modulation means 100.

This third embodiment differs from the first and second embodiments in that the power amplification unit 13 for changing the amplitude level of the 5.8 GHz band wireless carrier signal is installed so as to obtain an ASK modulated signal.

In FIG. 11, the same reference numerals are assigned to the same components used in the first embodiment. Such components will not be explained here. Hence, only the gate modulation circuit 12 and power amplification unit 13 will be explained in detail in the following.

The gate modulation circuit 12 converts the voltage level of the data signal supplied from the low pass filter 8 to a negative voltage level which is the gate bias condition of the power amplification unit 13. The gate modulation circuit 12 then supplies the converted data signal to the power amplification unit 13.

FIG. 12 shows in detail a first exemplary configuration of a gate modulation circuit 12 in which bipolar transistors are used. As shown in FIG. 12, the resistor 1201, the base and collector of the bipolar transistor 1202, a resistor 1205, and the base and collector of the bipolar transistor 1208 are serially connected between an input terminal IN and an output terminal OUT in this order from the input terminal IN to the output terminal OUT. The emitter of the bipolar transistor 1202 is connected to the positive power source +V via the resistor 1203. The collector of the bipolar transistor 1202 is connected to the negative power source −V via the resistor 1204. The base of the bipolar transistor 1208 is connected to the negative power source −V and ground GND via resistors 1206 and 1207. The collector of the bipolar transistor 1208 is connected to the negative power source −V. The emitter of the bipolar transistor 1208 is connected to the ground GND via a resistor 1209.

In addition, an inversion device 1210 is connected between the data signal input terminal a and the low pass filter 8. This inversion device 1210 inverts and drives the logic level of the given signal.

The resistor 1201 reduces the level of a rush current that is based on the signal supplied to the input terminal IN to prevent the bipolar transistor 1202 from being destroyed.

The bipolar transistor 1202 amplifies the signal supplied to its base from the resistor 1202 to produce from its collector an inverted and amplified signal. The bipolar transistor 1202 then supplies the inverted and amplified signal to the bipolar transistor 1208 via the resistor 1205.

The resistor 1205 reduces the level of a rush current that is based on the signal supplied from the bipolar transistor 1202 to prevent the bipolar transistor 1208 from being destroyed. In addition, the resistor 1205 holds the voltage level of the collector of the bipolar transistor 1202 and the voltage level of the base of the bipolar transistor 1208.

The resistors 1206 and 1207 apply a bias to the bipolar transistor 1208.

The collector of the bipolar transistor 1208 is connected to the negative power source −V. The emitter of the bipolar transistor 1208 is connected to the ground GND via the resistor 1209. The bipolar transistor 1208 amplifies the signal supplied from the resistor 1205 to the base and converts the voltage level of the signal to a negative level to produce from the emitter the converted and amplified signal to the output terminal OUT.

Thus, in this gate modulation circuit 12 of the first exemplary configuration, the bipolar transistor 1202 first inverts and amplifies the data signal whose logic level has been inverted that has been supplied from the low pass filter 8 to the input terminal IN. The bipolar transistor 1208 then converts and amplifies the voltage level of the inverted and amplified data signal to a negative level and sends the converted and amplified signal to the output terminal OUT. The converted and amplified signal is then supplied from the output terminal OUT to the power amplification unit 13.

By this operation, the gate modulation circuit 12 of the first exemplary configuration outputs a data signal whose voltage level has been converted to a negative level preserving the wave form of the data signal supplied to the data signal input terminal a.

FIG. 13 shows a second exemplary configuration of the gate modulation circuit 12 in which unipolar FETs are used. In FIG. 13, the resistor 1301 and the gate and source of the unipolar FET 1304 are connected serially in this order from the input terminal IN to the output terminal OUT between the input terminal IN and the output terminal OUT. The gate of the unipolar FET 1304 is connected to the negative power source −V and to the ground GND via resistors 1302 and 1303. The drain of the unipolar FET 1304 is connected to the negative power source −V.

An inversion device for inverting and driving the logic level of the given signal, which is not shown in the drawing, is installed in this gate modulation circuit 12 also between the data signal input terminal a and the low pass filter 8.

The resistor 1301 reduces the level of a rush current that is based on the signal supplied to the input terminal IN to prevent the unipolar FET 1304 from being destroyed.

The resistors 1302 and 1303 supply a bias to the unipolar FET 1304.

The unipolar FET 1304 amplifies the signal supplied from the resistor 1301 to its gate, inverts the voltage level of the received signal to a negative level, and sends the inverted and amplified signal from its source side to the output terminal.

Hence, using a unipolar FET, this gate modulation circuit 12 of the second exemplary configuration also amplifies and inverts to a negative level the voltage level of the data signal whose logic level has been inverted, which is supplied from the low pass filter 8 to the input terminal IN. The gate modulation circuit 12 then sends the inverted and amplified data signal from the output terminal OUT to the power amplification unit 13.

By this operation, this gate modulation circuit 12 of the second exemplary configuration outputs a data signal whose voltage level has been inverted to a negative level preserving the wave form of the data signal supplied to the data signal input terminal a.

AS shown in FIG. 11, the power amplification unit 13 has a first amplification unit 13a and a second amplification unit 13b each having a unipolar FET device. The data signal is supplied from the gate modulation circuit 12 to each of these two-stage amplification units 13a and 13b. Moreover, the power amplification unit 13 amplifies in two stages the 5.8 GHz band wireless carrier signal sent from the buffer amplifier 2 up to a prescribed power level while changing the power gains (amplification rates) of the amplification units 13a and 13b in accordance with the voltage level of the data signal supplied from the gate modulation circuit 12, and supplies the twice amplified data signal to the band-pass filter 5. Here, in comparison with the case in which an ASK modulation operation is performed at a low power level of the stage before the power amplification circuit as in the first or second embodiment, a high degree of modulation is difficult to achieve when the power amplification circuit itself performs an ASK modulation operation. For this reason, the data signal is supplied to each of the two-stage amplification units 13a and 13b to have the data signal amplified in two stages.

FIG. 14 shows in detail an exemplary configuration of this power amplification unit 13. In FIG. 14, the strip line 1401, the source and drain of the unipolar FET 1402, the strip line 1408, the capacitance device 1409, the strip line 1410, the gate and drain of the unipolar FET 1411, the strip line 1417, and the capacitance device 1418, are connected serially in this order from the input terminal IN to the output terminal OUT between the input terminal IN and the output terminal OUT. The sources of the unipolar FETs 1402 and 1411 are connected to the ground GND. The drains of the unipolar FETs 1402 and 1411 are connected to a positive power source +V via resistors 1403 and 1412, respectively. The capacitance device 1406, resistor 1405, and inductance device 1404 are connected serially in this order from the ground GND to the strip line 1401. The capacitance device 1415, resistor 1414, and inductance device 1413 are connected serially in this order from the ground GND to the strip line 1410. The connection node of the capacitance device 1406 and resistor 1405 and the connection node of the capacitance device 1415 and resistor 1414 are connected to the control terminal CONT.

The components indicated by reference numerals 1401 through 1409 form the first amplification unit 13a. The components indicated by reference numerals 1410 through 1418 form the second amplification unit 13b.

The data signal supplied to the control terminal CONT is input to the strip line 1401 via the capacitance device 1406, resistor 1405, and inductance device 1404 and to the strip line 1410 via the capacitance device 1415, resistor 1414, and inductance device 1413.

These capacitance devices 1406 and 1415, resistors 1405 and 1414, and inductance devices 1404 and 1413 remove unwanted high frequency components (noises) from the data signal supplied to the control terminal CONT.

First, the operation of the first amplification unit 13a will be explained. The unipolar FET 1402 amplifies the signal supplied from the strip line 1401 to its gate while adjusting its power gain (amplification factor) in accordance with the voltage level of the data signal supplied from the inductance device 1404. The unipolar FET 1402 then produces on its drain side a signal, which has been amplified to a first prescribed power level, having an amplitude that corresponds to the voltage level of the data signal. The unipolar FET 1402 then supplies this amplified signal to the strip line 1410 via the strip line 1408 and capacitance device 1409. This completes the operation of the first amplification unit 13a.

Next, the operation of the second amplification unit 13b will be explained. The unipolar FET 1411 further amplifies the signal supplied from the strip line 1410 to its gate while adjusting its power gain (amplification factor) in accordance with the voltage level of the data signal supplied from the inductance device 1413. The unipolar FET 1411 then produces on its drain side a signal, which has been further amplified to a second prescribed power level, having an amplitude that corresponds to the voltage level of the data signal. The unipolar FET 1411 then supplies this amplified signal to the output terminal OUT via the strip line 1417 and capacitance device 1418. This completes the operation of the second amplification unit 13b.

The capacitance devices 1409 and 1418 remove unwanted high frequency components (noises) of the signals supplied to the strip lines 1408 and 1417, respectively.

Thus, the power amplification unit 13 amplifies in two stages the 5.8 GHz band wireless carrier signal, which has been sent from the buffer amplifier 2 to the input terminal IN, up to a prescribed power level while changing the power gains (amplification factors) of the unipolar FETs 1402 and 1411 in accordance with the voltage level of the data signal supplied to the control terminal CONT. The power amplification unit 13 then supplies the twice-amplified data signal to the band-pass filter 5.

By this operation, the power amplification unit 13 outputs a 5.8 GHz band carrier signal whose amplitude corresponds to the power gain of the power amplification unit 13, that is, an ASK modulated signal in the 5.8 GHz band.

Next, the operation of the ASK modulator of this third embodiment will be explained in detail. The signal waveforms obtained in this case will not be shown here, since they are the same as those obtained in the first embodiment.

When a data signal, which has been transformed into a Manchester data signal from the original transmission data, is supplied to the low pass filter 8 via the data input terminal a, the low pass filter 8 smoothes the edge portion of the data signal by removing the high frequency components of the data signal, and supplies the smoothed data signal to the gate modulation circuit 12. The gate modulation circuit 12 then inverts the voltage level of the received data signal to a negative level, and sends the resultant data signal to the power amplification unit 13 preserving the wave form of the received data signal.

The power amplification unit 13 amplifies in two stages the 5.8 GHz band wireless carrier signal, which has been received from the buffer amplifier 2, up to a prescribed power level while changing the power gain (amplification factor) of the power amplification unit 13 in accordance with the voltage level of the data signal supplied from the gate modulation circuit 12. The power amplification unit 13 then supplies the amplified data signal, that is, an ASK modulated signal in the 5.8 GHz band as shown in FIG. 8(D) to the band-pass filter 5.

The band-pass filter 5 removes unwanted spurious radiation components from the ASK modulated signal output from the power amplification unit 13, and feeds the resultant ASK modulated signal to the antenna not shown in the drawings via the antenna terminal 6. The ASK modulated signal is then radiated as a radio wave from the antenna.

Thus, a low pass filter for removing high frequency components from the given data signal, a gate modulation circuit which receives the data signal from the low pass filter and inverts the voltage level of the received data signal to a negative level preserving the waveform of the received data signal, and a power amplification unit 13 which amplifies the 5.8 GHz band wireless carrier signal up to a prescribed power level while changing the power gain (amplification rate) of the power amplification unit in accordance with the voltage level of the data signal supplied from the gate modulation circuit are installed in the ASK modulator according to the above-described third embodiment. As a result, the spread of the frequency spectrum of the ASK modulated signal centered at 5.8 GHz is confined within a range determined by the cut-off characteristics of the band limiting low pass filter. Hence, the frequency band width of the ASK modulated signal is reduced.

(D) FOURTH EMBODIMENT

Figure 15:
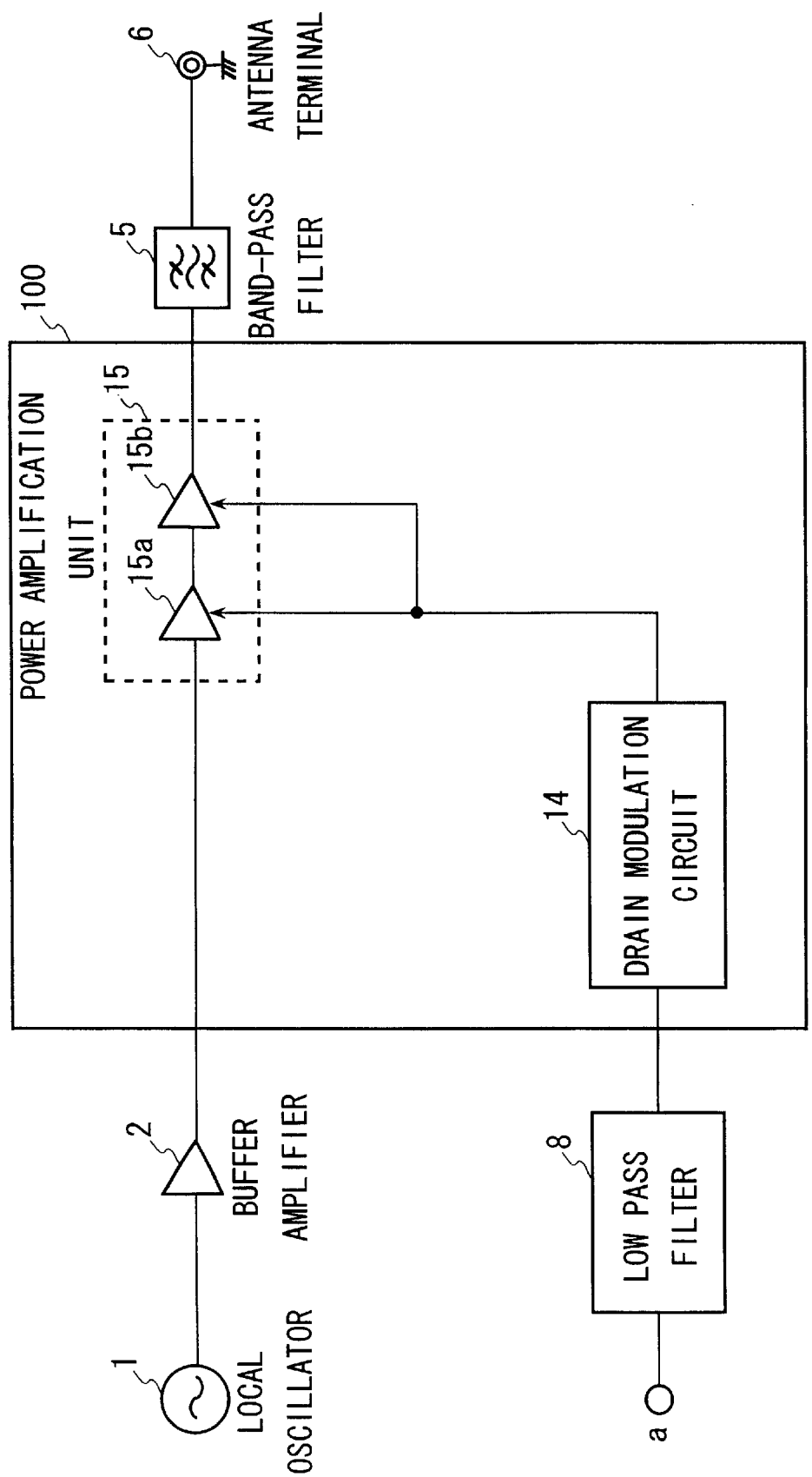
FIG. 15 is a block diagram showing the configuration of the fourth embodiment of the present invention.

In what follows, the fourth embodiment of the present invention in which an ASK modulator according to the present invention is applied to a wireless communication system in the wireless frequency 5.8 GHz band will be explained in detail with reference to the attached drawings. Here, FIG. 15 is a block diagram showing the configuration of this fourth embodiment. FIGS. 16 through 19 show in detail configurations of key components used in this embodiment. FIG. 20 shows signal waveforms obtained in this embodiment.

The ASK modulator of the fourth embodiment shown in FIG. 15 has a local oscillator 1, a buffer amplifier 2, a band-pass filter 5, an antenna terminal 6, a low pass filter 8, a drain modulation circuit 14, and a power amplification unit 15. The drain modulation circuit 14 and power amplification unit 15 form a modulation means 100.

This fourth embodiment differs from the third embodiment in the following respect. In the third embodiment, the gate bias of the power amplification unit was adjusted so as to produce the ASK modulated signal. In the fourth embodiment, the drain modulation circuit 14 containing power amplifiers amplifies the power level of a data signal supplied from the low pass filter 8. The first amplification unit 15a and second amplification unit 15b, which together form the power amplification unit 15, superpose this power-amplified data signal on a wireless carrier signal sent from the local oscillator 1 via the buffer amplifier 2. In this way, a desired ASK modulated signal is obtained.

In FIG. 15, the same reference numerals are assigned to the same components used in the first embodiment. Such components will not be explained here. Hence, only the drain modulation circuit 14 and power amplification unit 15 will be explained in detail in the following.

The drain modulation circuit 14 contains power amplifiers. The drain modulation circuit 14 amplifies the power level of the data signal received from the low pass filter 8 and supplies the power-amplified data signal to the power amplification unit 15 to enable the first amplification unit 15a and second amplification unit 15b to superpose the data signal sent from the data signal input terminal a via the low pass filter 8 onto a wireless carrier signal sent from the local oscillator 1 via the buffer amplifier 2.

Figure 16:
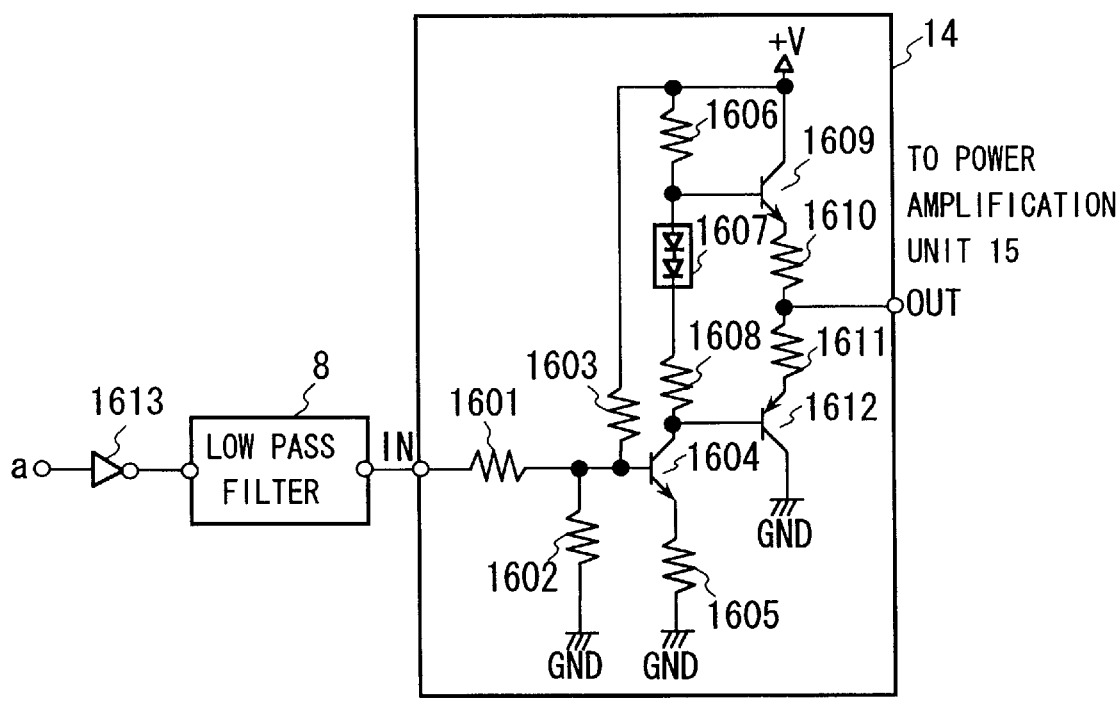
FIG. 16 is a block diagram showing a detailed first exemplary configuration of the drain modulation circuit 14.

FIG. 16 shows in detail a first exemplary configuration of the drain modulation circuit 14 in which bipolar transistors are used. In FIG. 16, the resistor 1601, the base and collector of the bipolar transistor 1604, the base and emitter of the bipolar transistor 1612, and the resistor 1611 are serially connected between an input terminal IN and an output terminal OUT in this order from the input terminal IN to the output terminal OUT. The resistor 1606, the diode 1607, the resistor 1608, the collector and emitter of the bipolar transistor 1604, and the resistor 1605 are serially connected in this order from the positive power source +V to the ground GND between the positive power source +V and the ground GND. In addition, the collector and emitter of the bipolar transistor 1609, the resistor 1609, and the collector and emitter of the bipolar transistor 1612 in this order from the positive power source +V to the ground GND between the positive power source +V and the ground GND. The base of the bipolar transistor 1604 is connected to the positive power source +V and to the ground GND via the resistors 1603 and 1602, respectively.

In addition, an inversion device 1613 is connected between the data signal input terminal a and the low pass filter 8. This inversion device 1210 inverts and drives the logic level of the given signal.

The resistor 1601 reduces the level of a rush current that is based on the signal supplied to the input terminal IN to prevent the bipolar transistor 1604 from being destroyed.

The resistors 1602 and 1603 apply a bias to the bipolar transistor 1604.

The bipolar transistor 1604 amplifies and inverts the signal supplied to its base from the resistor 1601 to produce from its collector an inverted and amplified signal. The bipolar transistor 1604 then supplies the inverted and amplified signal to the bipolar transistor 1612.

The bipolar transistor 1612 amplifies the signal supplied to its base of the bipolar transistor 1612 from the bipolar transistor 1604 to produce from its emitter the amplified signal to the output terminal OUT via the resistor 1611.

Thus, in this drain modulation circuit 14 of the first exemplary configuration, the bipolar transistor 1604 first inverts and amplifies the data signal whose logic level has been inverted that has been supplied from the low pass filter 8 to the input terminal IN. The bipolar transistor 1612 then further amplifies this inverted and amplified data signal and sends this further amplified signal to the output terminal OUT. The inverted and amplified signal is then supplied from the output terminal OUT to the power amplification unit 15.

By this operation, the drain modulation circuit 14 of the first exemplary configuration outputs a data signal having a power level at which the data signal can be superposed on the wireless carrier signal in the first amplification unit 15a and second amplification unit 15b of the power amplification unit 15.

Figure 17:
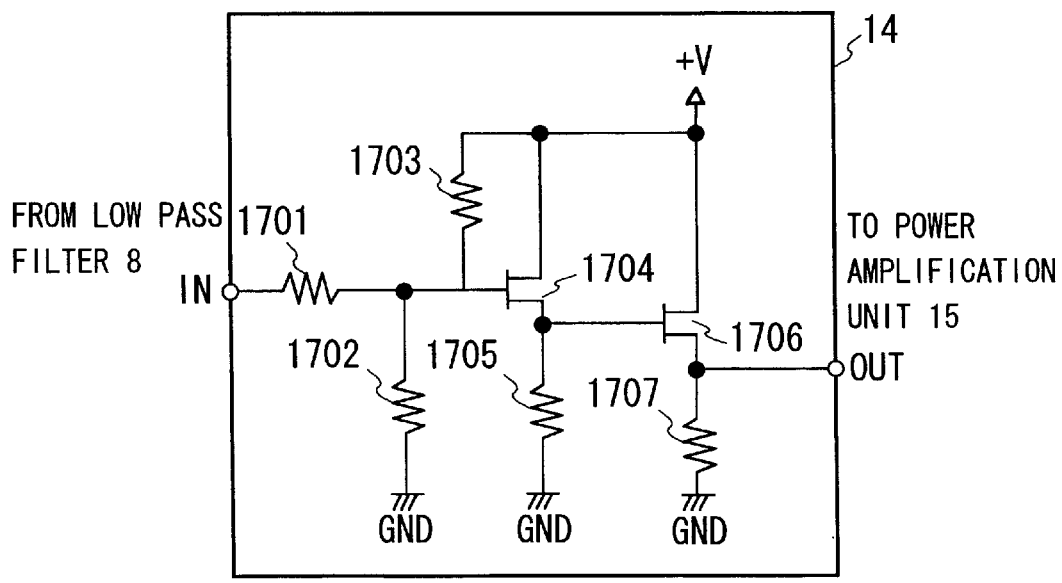
FIG. 17 is a block diagram showing a detailed second exemplary configuration of the drain modulation circuit 14.

FIG. 17 shows a second exemplary configuration of the drain modulation circuit 14 in which unipolar FETs are used. In FIG. 17, the resistor 1701, the gate and source of the unipolar FET 1704, the gate and source of the unipolar FET 1706 are connected serially in this order from the input terminal IN to the output terminal OUT between the input terminal IN and the output terminal OUT. The drains of the unipolar FETs 1704 and 1706 are connected to the positive power source +V. The sources of the unipolar FETs 1704 and 1706 are connected to the ground GND via resistors 1705 and 1707, respectively. The gate of the unipolar FET 1704 is connected to the positive power source +V and to the ground GND via resistors 1703 and 1702, respectively.

It is to be noted here that no inversion device is installed in this drain modulation circuit 14 between the data signal input terminal a and the low pass filter 8.

The resistor 1701 reduces the level of a rush current that is based on the signal supplied to the input terminal IN to prevent the unipolar FET 1704 from being destroyed.

The resistors 1702 and 1703 supply a bias to the unipolar FET 1704.

The unipolar FET 1704 amplifies and inverts the signal supplied to its gate from the resistor 1701 to produce an inverted and amplified signal on its source side. The unipolar FET 1704 then supplies the inverted and amplified signal to the unipolar FET 1706.

The unipolar FET 1706 further amplifies the signal supplied to its gate from the unipolar FET 1704 to produce on its source side an inverted and further amplified signal. The unipolar FET 1706 then supplies this inverted and further amplified data signal to the output terminal OUT.

Thus, in this drain modulation circuit 14 of the second exemplary configuration also, the unipolar FET 1704 first inverts and amplifies the data signal supplied from the low pass filter 8 to the input terminal IN and sends the inverted and amplifies signal to the unipolar FET 1706. The unipolar FET 1706 then further inverts and amplifies the received data signal and sends it to the output terminal OUT. This inverted and further amplified signal is then supplied from the output terminal OUT to the power amplification unit 15.

By this operation, the drain modulation circuit 14 of the second exemplary configuration also outputs a data signal having a power level at which the data signal can be superposed on the wireless carrier signal in the first amplification unit 15a and second amplification unit 15b of the power amplification unit 15.

Figure 18:
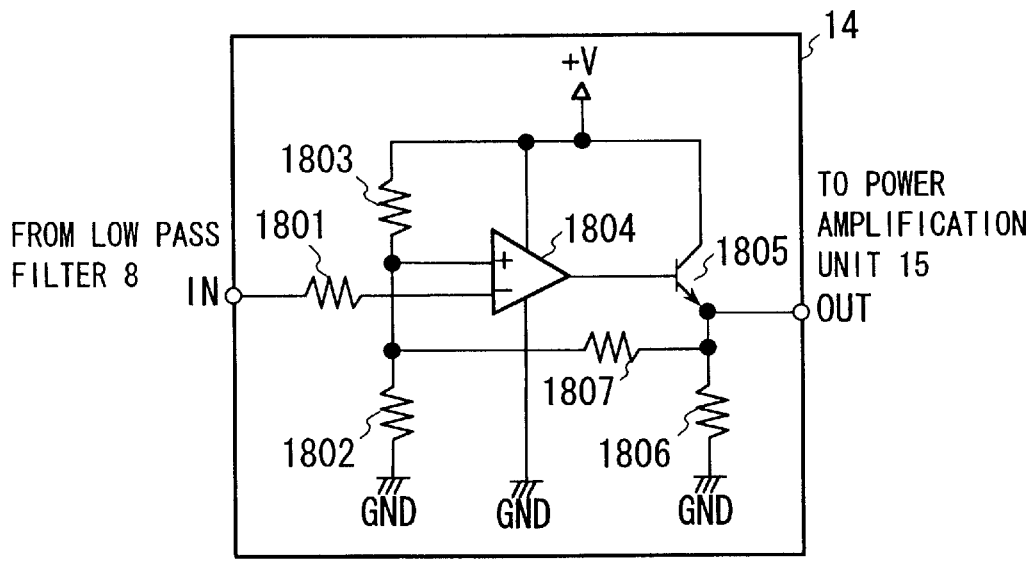
FIG. 18 is a block diagram showing a detailed third exemplary configuration of the drain modulation circuit 14.

FIG. 18 shows a third exemplary configuration of the drain modulation circuit 14 in which operation amplifiers are used. In FIG. 18, the resistor 1801, the inversion input terminal and output terminal of the operation amplifier 1804, the base and emitter of the bipolar transistor 1805 are connected serially in this order from the input terminal IN to the output terminal OUT between the input terminal IN and the output terminal OUT.

The non-inversion input terminal of the operation amplifier 1804 is connected to the positive power source +V and to the ground GND via resistors 1803 and 1802, respectively. The collector of the bipolar transistor 1805 is connected to the positive power source +V. The emitter of the bipolar transistor 1805 is connected to the ground GND via the resistor 1806.

It is to be noted here that an inversion device not shown in the drawings is installed in this drain modulation circuit 14 between the data signal input terminal a and the low pass filter 8.

The resistor 1801 reduces the level of a rush current that is based on the signal supplied to the input terminal IN to prevent the operation amplifier 1804 from being destroyed.

The resistors 1802 and 1803 are configured so that the level of the voltage at the connection node of the resistors 1802 and 1803 will become equal to an intermediate voltage level of the dynamic range of the data signal supplied to the input terminal IN.

The operation amplifier 1804 inverts and amplifies the signal, which is supplied to its inversion input terminal from the resistor 1801, with respect to the voltage level of a signal supplied to its non-inversion input terminal. The operation amplifier 1804 then supplies this inverted and amplified signal to the bipolar transistor 1805.

The bipolar transistor 1805 further amplifies the signal supplied to its gate from the operation amplifier 1804 to produce on its emitter side a further amplified signal. The bipolar transistor 1805 then supplies this further amplified data signal to the output terminal OUT.

Thus, in this drain modulation circuit 14 of the third exemplary configuration also, the operation amplifier 1804 first inverts and amplifies the data signal whose logic level is inverted, which is supplied from the low pass filter 8 to the input terminal IN, and then sends the inverted and amplified data signal to the bipolar transistor 1805. The bipolar transistor 1805 then further amplifies the received data signal and sends it to the output terminal OUT. This inverted and further amplified signal is then supplied from the output terminal OUT to the power amplification unit 15.

By this operation, the drain modulation circuit 14 of the third exemplary configuration also outputs a data signal having a power level at which the data signal can be superposed on the wireless carrier signal in the first amplification unit 15a and second amplification unit 15b of the power amplification unit 15.

Each of the first amplification unit 15a and second amplification unit 15b has a unipolar FET device. The data signal is supplied from the drain modulation circuit 14 to each of these two-stage amplification units 15a and 15b. Moreover, the power amplification unit 15 synthesizes by superposition the 5.8 GHz band wireless carrier signal, which has been amplified up to a prescribed power level sent from the buffer amplifier 2, with the data signal supplied from the drain modulation circuit 14 and supplies the synthesized signal to the band-pass filter 5. Here, for the same reason as stated in the third embodiment, the data signal is fed to both of these two-stage amplification units 15a and 15b.

Figure 19:
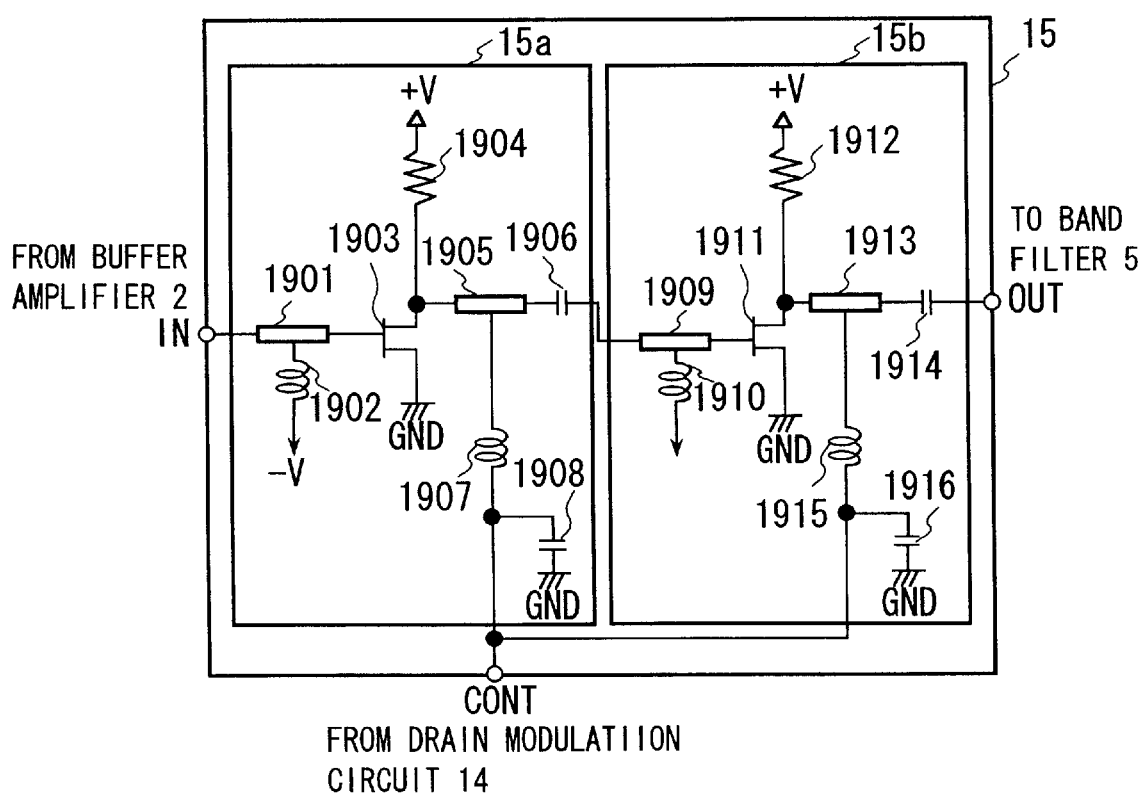
FIG. 19 is a block diagram showing a detailed exemplary configuration of the power amplification unit 15.
Figure 20:
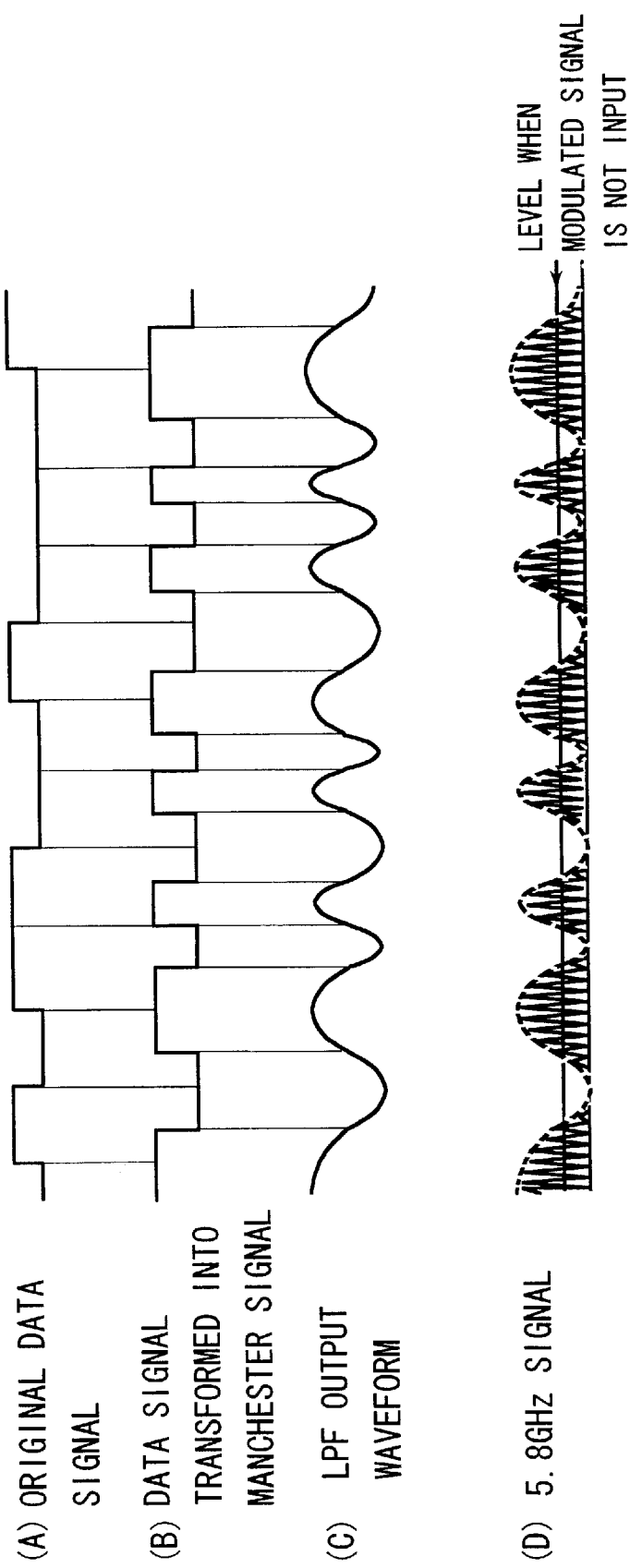
FIG. 20(A) shows the waveform of the original transmission data signal to be supplied to the ASK modulator according to the fourth embodiment.
FIG. 20(B) shows the waveform of a Manchester signal transformed from the original transmission data signal to be supplied to the data signal input terminal of the ASK modulator according to the fourth embodiment.
FIG. 20(C) shows the waveform of the transmission data signal smoothed by the low pass filter of the ASK modulator according to the fourth embodiment.
FIG. 20(D) shows the waveform of a 5.8 GHz band ASK modulated signal generated by the ASK modulator according to the fourth embodiment.

FIG. 19 shows in detail an exemplary configuration of this power amplification unit 15. In FIG. 19, the strip line 1901, the gate and drain of the unipolar FET 1903, the strip line 1905, the capacitance device 1906, the strip line 1909, the gate and drain of the unipolar FET 1911, the strip line 1913, and the capacitance device 1914, are connected serially in this order from the input terminal IN to the output terminal OUT between the input terminal IN and the output terminal OUT. The sources of the unipolar FETs 1903 and 1911 are connected to the ground GND. The drains of the unipolar FETs 1903 and 1911 are connected to the positive power source +V via resistors 1904 and 1912, respectively. The strip lines 1901 and 1909 are connected to the negative power source −V via resistors 1902 and 1910, respectively. The capacitance device 1908 and inductance device 1907 are connected serially in this order from the ground GND to the strip line 1905 between the ground GND and the strip line 1905. The capacitance device 1916 and inductance device 1915 are connected serially in this order from the ground GND to the strip line 1913 between the ground GND and the strip line 1913. The connection node of the capacitance device 1908 and inductance device 1907 and the connection node of the capacitance device 1916 and inductance device 1915 are connected to the control terminal CONT.

It is to be noted that the components indicated by the reference numerals 1901 through 1908 form the first amplification unit 15*a*, and the components indicated by the reference numerals 1909 through 1916 form the second amplification unit 15*b*.

The inductance devices 1902 and 1910 remove unwanted high frequency components (noises) from the data signal supplied to the strip lines 1901 and 1909, respectively. In addition, the inductance device 1902 inverts the voltage level of the signal input to the strip line 1901 to a negative voltage level, which is the required gate bias condition, and supplies the inverted signal to the unipolar FET 1903. Similarly, the inductance device 1910 inverts the voltage level of the signal input to the strip line 1909 to a negative voltage level, which is the required gate bias condition, and supplies the inverted signal to the unipolar FET 1911.

The unipolar FET 1903 amplifies the signal supplied from the strip line 1901 to produce on its drain side an inverted signal and to supply the amplified signal to the strip line 1905. Similarly, the unipolar FET 1911 amplifies the signal supplied from the strip line 1909 to produce on its drain side an inverted signal and to supply the amplified signal to the strip line 1913.

The data signal supplied to the control terminal CONT is input to the strip line 1905 via the capacitance device 1908 and inductance device 1907, and also to the strip line 1913 via the capacitance device 1916 and inductance device 1915.

The capacitance devices 1908 and 1916 and the inductance devices 1907 and 1915 remove unwanted high frequency components (noises) from the data signal supplied from the control terminal CONT.

The strip line 1905 of the first amplification unit 15*a* synthesizes by superposition the signal supplied from the unipolar FET 1903 with the data signal supplied from the control terminal CONT via the inductance device 1907. The strip line 1905 then feeds the synthesized signal to the strip line 1909 via the capacitance device 1906. The strip line 1909 feeds the received signal to the unipolar FET 1911 of the second amplification unit 15*b*. Similarly, the strip line 1913 of the second amplification unit 15*b* synthesizes by superposition the signal supplied from the unipolar FET 1911 with the data signal supplied from the control terminal CONT via the inductance device 1915. The strip line 1913 then feeds the synthesized signal to the output terminal via the capacitance device 1914.

The capacitance devices 1906 and 1914 remove unwanted high frequency components (noises) from the data signal supplied from the strip lines 1905 and 1913, respectively.

Thus, in the power amplification unit 15, the unipolar FET 1903 of the first amplification unit 15*a* amplifies the 5.8 GHz band wireless carrier signal, which has been sent from the buffer amplifier 2 to the input terminal IN, up to a first prescribed power level, and sends the amplified signal to the strip line 1905. The strip line 1905 then synthesizes by superposition the data signal supplied from the drain modulation circuit 14 to the control terminal CONT with the amplified signal received from the unipolar FET 1903 and sends the synthesized signal to the unipolar FET 1911 of the second amplification unit 15*b* via the capacitance device 1906, strip line 1909, and inductance device 1910. Next, the unipolar FET 1911 further amplifies the received signal up to a second prescribed power level, and sends the further amplified signal to the strip line 1913. The strip line 1913 further synthesizes by superposition the received signal with the data signal supplied to the control terminal CONT from the drain modulation circuit 14. The resultant twice-amplified signal is then sent from the output terminal OUT to the band-pass filter 5.

In this way, the power amplification unit 15 outputs an ASK modulated signal in the 5.8 GHz band.

Next, the operation of the ASK modulator of this fourth embodiment will be explained in detail with reference to signal wave form diagrams shown in FIG. 20.

When the data signal shown in FIG. 20(B), which has been transformed into a Manchester data signal from the original transmission data shown in FIG. 20(A), is supplied to the low pass filter 8 via the data input terminal a, the low pass filter 8 smoothes the edge portion of the data signal by removing the high frequency components of the data signal to obtain a wave form as shown in FIG. 20(C). The low pass filter 8 then supplies the smoothed data signal to the drain modulation circuit 14. The drain modulation circuit 14 then amplifies the power level of the data signal received from the low pass filter 8 and supplies the power-amplified data signal to the power amplification unit 15 to enable the power amplification unit 15 to superpose the data signal sent from the data signal input terminal a via the low pass filter 8 onto a wireless carrier signal sent from the local oscillator 1 via the buffer amplifier 2.

The power amplification unit 15 amplifies the 5.8 GHz band wireless carrier signal, which has been received from the buffer amplifier 2, up to a prescribed power level. The power amplification unit 15 then synthesizes by superposition the 5.8 GHz band wireless carrier signal with the data signal sent from the drain modulation circuit 14 and outputs an ASK modulated signal in the 5.8 GHz band as shown in FIG. 20(D) to the band-pass filter 5.

The band-pass filter 5 removes unwanted spurious radiation components from the ASK modulated signal output from the power amplification unit 15, and feeds the resultant ASK modulated signal to an antenna not shown in the drawings via the antenna terminal 6. The ASK modulated signal is then radiated as a radio wave from the antenna.

As shown in FIG. 20(D), the maximum amplitude of the ASK modulated signal wave obtained in this fourth embodiment is greater than the maximum amplitudes of the ASK modulated signal waves obtained in the first through third embodiments.

To be more specific, each of the bias constants of the drain modulation circuit 14 is selected so that the output power level of the power amplification unit 15 will become equal to the maximum output level achieved in the first through third embodiments when the data signal is not supplied to the data input terminal a. By selecting the bias constants of the drain modulation circuit 14 in this way, the amplitude of the signal output from the power amplification unit 15 is increased or decreased in accordance with the fluctuation of the waveform of the supplied data signal. Therefore, when the data signal is a logic "H" signal, the maximum output level of the ASK modulated signal obtained in this case becomes higher than that in the case in which no data signal is supplied to the data input terminal a. This fourth embodiment differs from the first through third embodiments in this respect as shown in FIG. 20(D).

Thus, a low pass filter for removing high frequency components from the given data signal, a drain modulation circuit which amplifies the power level of the data signal received from the low pass filter and supplies the power-amplified data signal to the power amplification unit to enable the power amplification unit to superpose the data signal sent from the data signal input terminal a via the low pass filter onto a wireless carrier signal sent from the local oscillator 1 via the buffer amplifier, and a power amplification unit which amplifies the 5.8 GHz band wireless carrier signal received from the buffer amplifier up to a prescribed power level and then synthesizes by superposition the amplified 5.8 GHz band wireless carrier signal with the data signal sent from the drain modulation circuit are installed in the ASK modulator of the fourth embodiment. Therefore, the spread of the spectrum of the ASK modulated signal centered at 5.8 GHz is confined within a ranged determined by the cut-off characteristics of the low pass filter. As a result, the frequency band width of the ASK modulated signal is reduced.

(E) FIFTH EMBODIMENT

Figure 21:
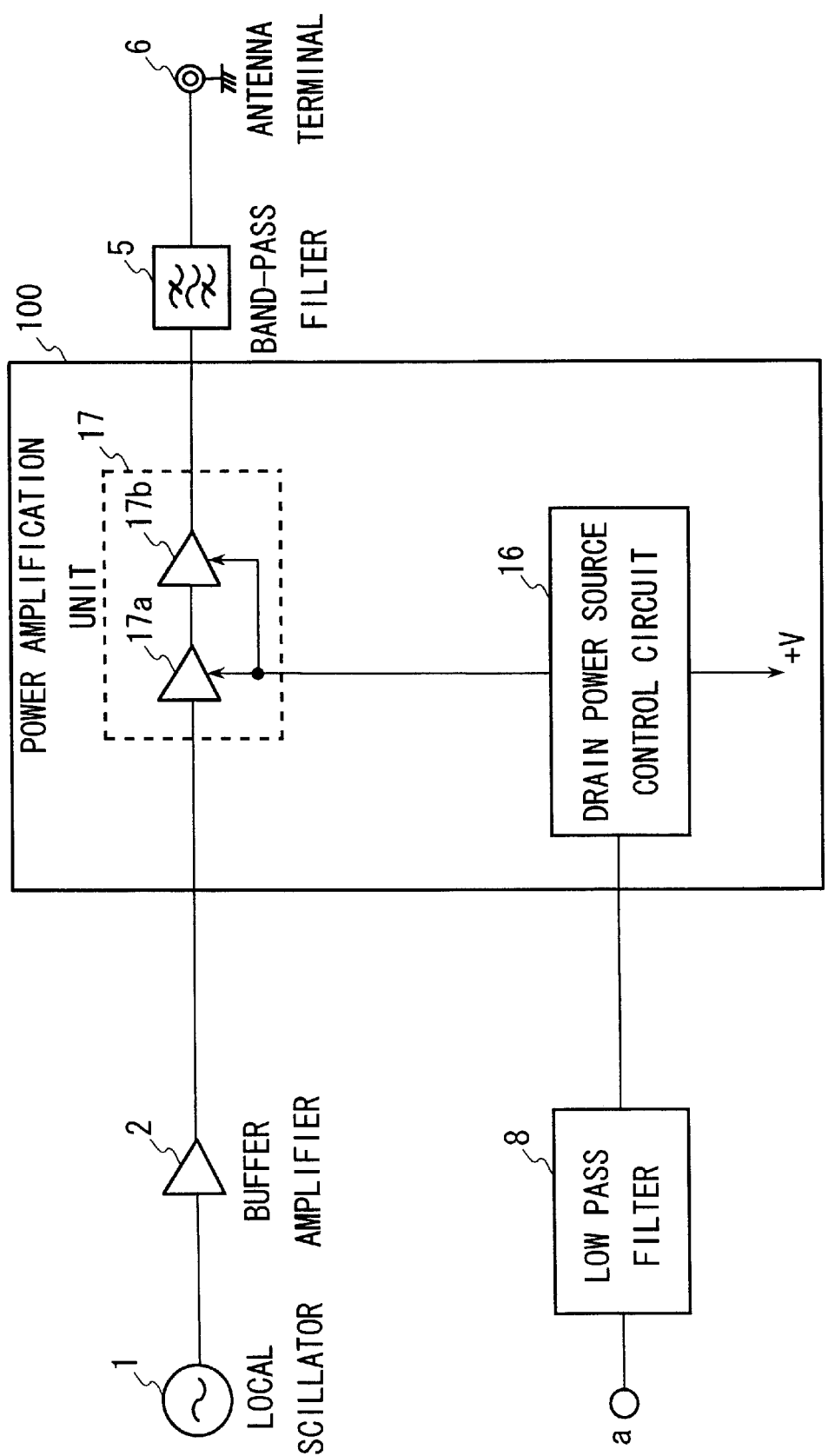
FIG. 21 is a block diagram showing the configuration of the fifth embodiment of the present invention.
Figure 22:
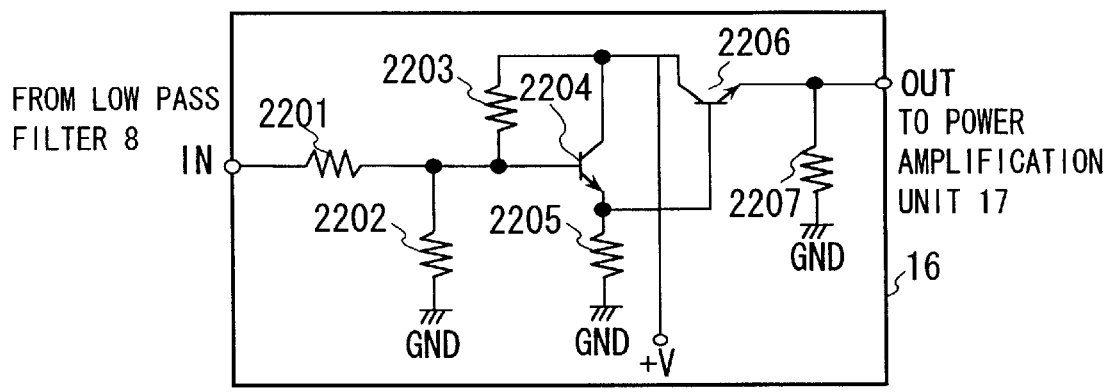
FIG. 22 is a block diagram showing a detailed first exemplary configuration of the drain power source control circuit 16.
Figure 23:
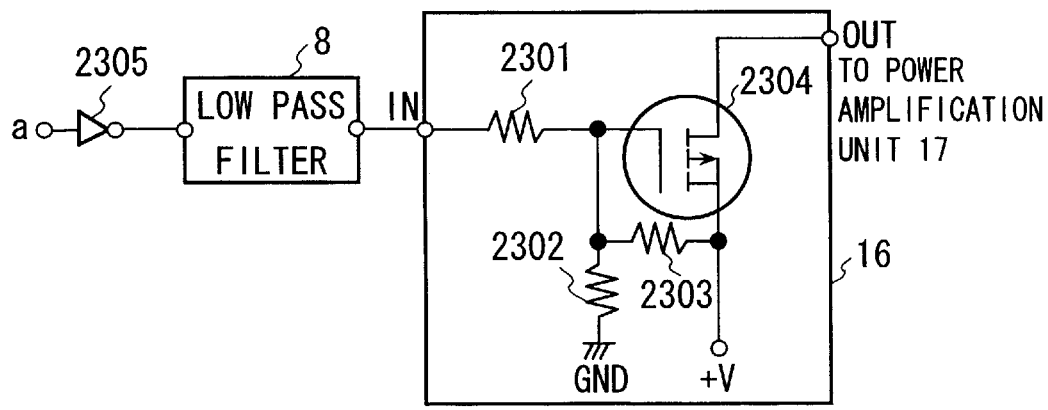
FIG. 23 is a block diagram showing a detailed second exemplary configuration of the drain power source control circuit 16.
Figure 24:
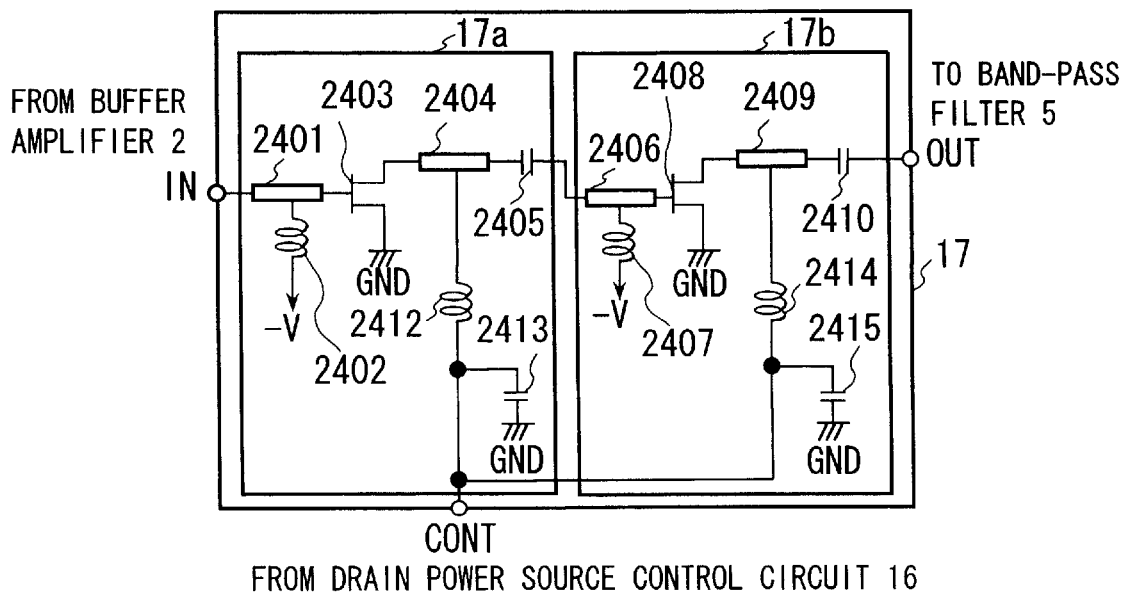
FIG. 24 is a block diagram showing a detailed exemplary configuration of the power amplification unit 17.

In what follows, the fifth embodiment of the present invention in which an ASK modulator according to the present invention is applied to a wireless communication system in the wireless frequency 5.8 GHz band will be explained in detail with reference to FIGS. 21 through 24. Here, FIG. 21 is a block diagram showing the configuration of this fifth embodiment. FIGS. 22 through 24 show in detail the configurations of key components used in this embodiment.

The ASK modulator of the fifth embodiment shown in FIG. 21 has a local oscillator 1, a buffer amplifier 2, a band-pass filter 5, an antenna terminal 6, a low pass filter 8, a drain power source control circuit 16, and a power amplification unit 17. The drain power source control circuit 16 and power amplification unit 17 form a modulation means 100.

In this fifth embodiment, by having the drain power source control circuit 16 increase or decrease the power source level to be supplied to the power amplification unit 17, the power gain (amplification factor) of the power amplification unit 17 is changed so as to obtain a 5.8 GHz band wireless carrier signal having an amplitude that corresponds to this power gain, that is, an ASK modulated signal in the 5.8 GHz band.

In FIG. 21, the same reference numerals are assigned to the same components used in the first embodiment. Such components will not be explained here. Hence, only the drain power source control circuit 16 and power amplification unit 17 will be explained in detail in the following.

The drain power source control circuit 16 generates a power source current signal whose waveform is equivalent to the waveform of the data signal supplied from the low pass filter 8, and supplies the generated power source current signal to the power amplification unit 17.

FIG. 22 shows in detail a first exemplary configuration of a drain power source control circuit 16 in which bipolar transistors are used. In FIG. 22, the resistor 2201, the base and emitter of the bipolar transistor 2204, and the base and emitter of the bipolar transistor 2206 are serially connected between the input terminal IN and output terminal OUT in this order from the input terminal IN to the output terminal OUT. The base of the bipolar transistor 2204 is connected to the ground GND and to the positive power source +V via resistors 2202 and 2203, respectively. The collectors of the bipolar transistors 2204 and 2206 are connected to the positive power source +V. The emitters of the bipolar transistors 2204 and 2206 are connected to the ground GND via resistors 2205 and 2207, respectively.

The resistor 2201 reduces the level of a rush current that is based on the signal supplied to the input terminal IN to prevent the bipolar transistor 2204 from being destroyed.

The resistors 2202 and 2203 apply a bias to the bipolar transistor 2204.

The bipolar transistor 2204 amplifies the signal supplied to its base from the input terminal IN and produces from its emitter an amplified signal. The bipolar transistor 2204 then supplies the amplified signal to the bipolar transistor 2206.

The bipolar transistor 2206 amplifies the signal supplied to its from the bipolar transistor 2204 and produces from its emitter a power source current signal whose level corresponds to the level of the amplified signal. The bipolar transistor 2206 then supplies this power source current signal to the output terminal OUT.

Thus, in this drain power source control circuit 16 of the first exemplary configuration, the bipolar transistor 2204 first amplifies the data signal supplied from the low pass filter 8 to the input terminal IN and sends the amplified signal to the bipolar transistor 2206. The bipolar transistor 2206 then converts this amplified data signal to a power source current signal and sends this power source current signal to the output terminal OUT. The power source current signal is then supplied from the output terminal OUT to the power amplification unit 17.

By this operation, the drain power source control circuit 16 of the first exemplary configuration outputs a power source current signal whose waveform is equivalent to the waveform of the data signal.

FIG. 23 shows a second exemplary configuration of the drain power source control circuit 16 in which unipolar FETs are used. In FIG. 23, the resistor 2301 and the gate and source of the unipolar FET 2304 are connected serially in this order from the input terminal IN to the output terminal OUT between the input terminal IN and the output terminal OUT. The drain of the unipolar FET 2304 is connected to the positive power source +V. The gate of the unipolar FET 2304 is connected to the ground GND and to the positive power source +V via resistors 2302 and 2303, respectively.

It is to be noted here that an inversion device 2305 is installed in this second exemplary configuration of the drain power source control circuit 16 between the data signal input terminal a and the low pass filter 8.

The resistor 2301 reduces the level of a rush current that is based on the signal supplied to the input terminal IN to prevent the unipolar FET 2304 from being destroyed.

The resistors 2302 and 2303 supply a bias to the unipolar FET 2304.

The unipolar FET 2304 amplifies the signal supplied to its gate from the input terminal IN and produces on its source side a power source current signal whose amplitude level corresponds to the amplitude level of this signal supplied from the input terminal IN amplified signal. In this case, the logic level of the obtained power source current signal is inverted. The unipolar FET 2304 then supplies the converted power source current signal to the output terminal OUT.

Thus, in this drain power source control circuit 16 of the second exemplary configuration also, the unipolar FET 2304 first converts the data signal, which has been supplied from the low pass filter 8, whose logic level has been inverted by the low pass filter 8 to a power source current signal and sends the power source current signal to the output terminal OUT. The power source current signal is then sent from the output terminal OUT to the power amplification unit 17.

By this operation, the drain power source control circuit 16 of the second exemplary configuration also outputs a power source current signal having the same waveform as the data signal.

The power amplification unit 17 is composed of a first amplification unit 17a and a second amplification unit 17b, which are serially connected in two stages. Each of the first amplification unit 17a and second amplification unit 17b has a unipolar FET device. The drain power source control circuit 16 supplies the power source current signal to each of these two-stage amplification units 17a and 17b. Moreover, the power amplification unit 17 amplifies the 5.8 GHz band wireless carrier signal, which is sent from, the buffer amplifier 2, up to a prescribed power level while changing the power gains (amplification rate) of the amplification units 17a and 17b in accordance with the amplitude level of the power source current signal supplied from the drain power source control circuit 16 and feeds the 5.8 GHz band wireless carrier signal to the band-pass filter 5. For the same reason as stated in the third embodiment, the power source current signal is supplied to both the first and second amplification units 17a and 17b in which the power source current signal is amplified.

FIG. 24 shows in detail an exemplary configuration of this power amplification unit 17. In FIG. 24, the strip line 2401, the gate and drain of the unipolar FET 2403, the strip line 2404, the capacitance device 2405, the strip line 2406, the gate and drain of the unipolar FET 2408, the strip line 2409, and the capacitance device 2410 are connected serially in this order from the input terminal IN to the output terminal OUT between the input terminal IN and the output terminal OUT. The sources of the unipolar FETs 2403 and 2408 are connected to the ground GND. The inductance device 2407 is connected between the strip line 2406 and the ground GND. The inductance device 2402 is connected between the strip line 2401 and the ground GND. The capacitance device 2412 and inductance device 2412 are connected serially in this order from the ground GND to the strip line 2404 between the strip line 2404 and the ground GND. The capacitance device 2415 and inductance device 2414 are connected serially in this order from the ground GND to the strip line 2409 between the strip line 2409 and the ground GND. The connection node of the capacitance device 2413 and inductance device 2412 and the connection node of the capacitance device 2415 and inductance device 2414 are both connected to the control terminal CONT.

The components indicted by reference numerals 2401, 2402, 2403, 2404, 2405, 2412, and 2413 form the first amplification unit 17a. The components indicted by reference numerals 2406, 2407, 2408, 2409, 2410, 2414, and 2415 form the second amplification unit 17b.

The inductance devices 2402 and 2407 remove unwanted high frequency components (noises) from the data signal supplied to the strip lines 2401 and 2406, respectively. In addition, the inductance device 2402 inverts the voltage level of the input signal to a negative voltage level, which is the required gate bias condition, and supplies the inverted signal to the unipolar FET 2403. Similarly, the inductance device 2407 inverts the voltage level of the input signal to a negative voltage level, which is the required gate bias condition, and supplies the inverted signal to the unipolar FET 2408.

The power source current signal supplied to the control terminal CONT is supplied to the strip line 2404 via the inductance device 2412 and capacitance device 2413 and also to the strip line 2409 via the inductance device 2414 and capacitance device 2415.

The inductance devices 2412 and 2414 and the capacitance devices 2413 and 2415 remove unwanted high frequency components (noises) from the power source current signal supplied from the control terminal CONT.

Each of the unipolar FETs 2403 and 2408 has a power gain (amplification factor) that corresponds to the amplitude level of the power source current signal supplied to the strip lines 2404 and 2409, respectively.

In addition, the unipolar FET 2403 of the first amplification unit 17a amplifies the signal supplied from the strip line 2401 to produce on its drain side a power-amplified signal and supplies the power-amplified signal to the strip line 2406 via the strip line 2404 and capacitance device 2405. The strip line 2406 then sends the power-amplified signal to the gate of the unipolar FET 2408 of the second amplification unit 17b. Similarly, the unipolar FET 2408 further amplifies the signal supplied from the strip line 2406 to produce on its drain side a further power-amplified signal and supplies the further power-amplified signal to the output terminal OUT via the strip line 2409 and capacitance device 2410.

The capacitance devices 2405 and 2410 remove unwanted high frequency components (noises) from the signals supplied from the strip lines 2404 and 2409, respectively.

Thus, the power amplification unit 17 amplifies the 5.8 GHz band wireless carrier signal, which is supplied from the buffer amplifier 2 to the input terminal IN, to a prescribed power level while changing the power gains (amplification factors) of the unipolar FETs 2403 and 2408 in accordance with the amplitude level of the power source current signal supplied from the drain power source control circuit 16 to the control terminal CONT, and then feeds this amplified signal to the band-pass filter 5.

By this operation, the power amplification unit 17 outputs a 5.8 GHz band carrier signal having an amplitude level that corresponds to its power gain, that is, an ASK modulated signal in the 5.8 GHz band.

Next, the operation of the ASK modulator of this fifth embodiment will be explained in detail. The signal waveforms obtained in this case will not be shown since they are the same as those obtained in the fourth embodiment.

When a data signal, which has been transformed into a Manchester data signal from the original transmission data, is supplied to the low pass filter 8 via the data input terminal a, the low pass filter 8 smoothes the edge portion of the data signal by removing the high frequency components of the data signal. The low pass filter 8 then supplies the smoothed data signal to the drain power source control circuit 16. The drain power source control circuit 16 then generates a power source current signal having the same waveform as the given data signal and supplies the power source current signal to the power amplification unit 17.

The power amplification unit 17 amplifies the 5.8 GHz band wireless carrier signal, which has been received from the buffer amplifier 2, up to a prescribed power level while changing the power gains (amplification factors) of the unipolar FETs 2403 and 2408 in accordance with the amplitude level of the power source current signal supplied from the drain power source control circuit 16, and then feeds this amplified signal, that is, an ASK modulated signal in the 5.8 GHz band, to the band-pass filter 5. Hence, when the level of the power source of the power amplification unit 17 is increased or decreased, the power gain (amplification factor) of the power amplification unit 17 is also increased or decreased accordingly. As a result, the power amplification unit 17 outputs an ASK modulated signal in the 5.8 GHz band as shown in FIG. 20(D).

The band-pass filter 5 removes unwanted spurious radiation components from the ASK modulated signal output from the power amplification unit 17, and feeds the resultant ASK modulated signal to an antenna not shown in the drawings via the antenna terminal 6. The ASK modulated signal is then radiated as a radio wave from the antenna.

Thus, a low pass filter for removing high frequency components from the given data signal, a drain power source control circuit which generates a power source current signal having the same waveform as the data signal input from the low pass filter, and a power amplification unit which amplifies a 5.8 GHz band wireless carrier signal to a prescribed power level while changing the power gain in accordance with the amplitude level of the power source current signal sent from the drain power source control circuit are installed in the ASK modulator of the fifth embodiment. Therefore, the spread of the spectrum of the ASK modulated signal centered at 5.8 GHz is confined within a ranged determined by the characteristics of the low pass filter. As a result, the frequency band width of the ASK modulated signal is reduced.

(F) SIXTH EMBODIMENT

Figure 25:
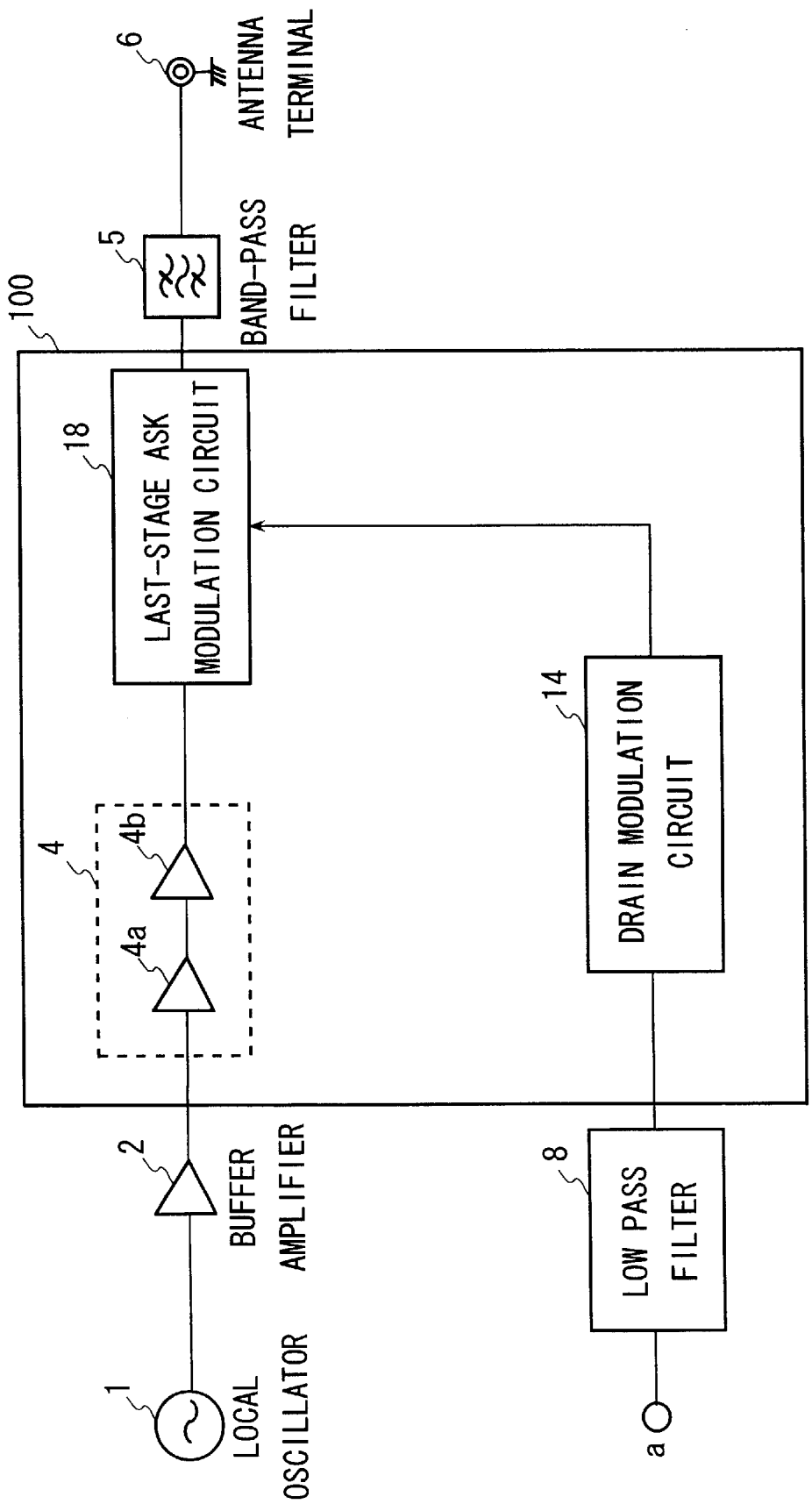
FIG. 25 is a block diagram showing the configuration of the sixth embodiment of the present invention.
Figure 26:
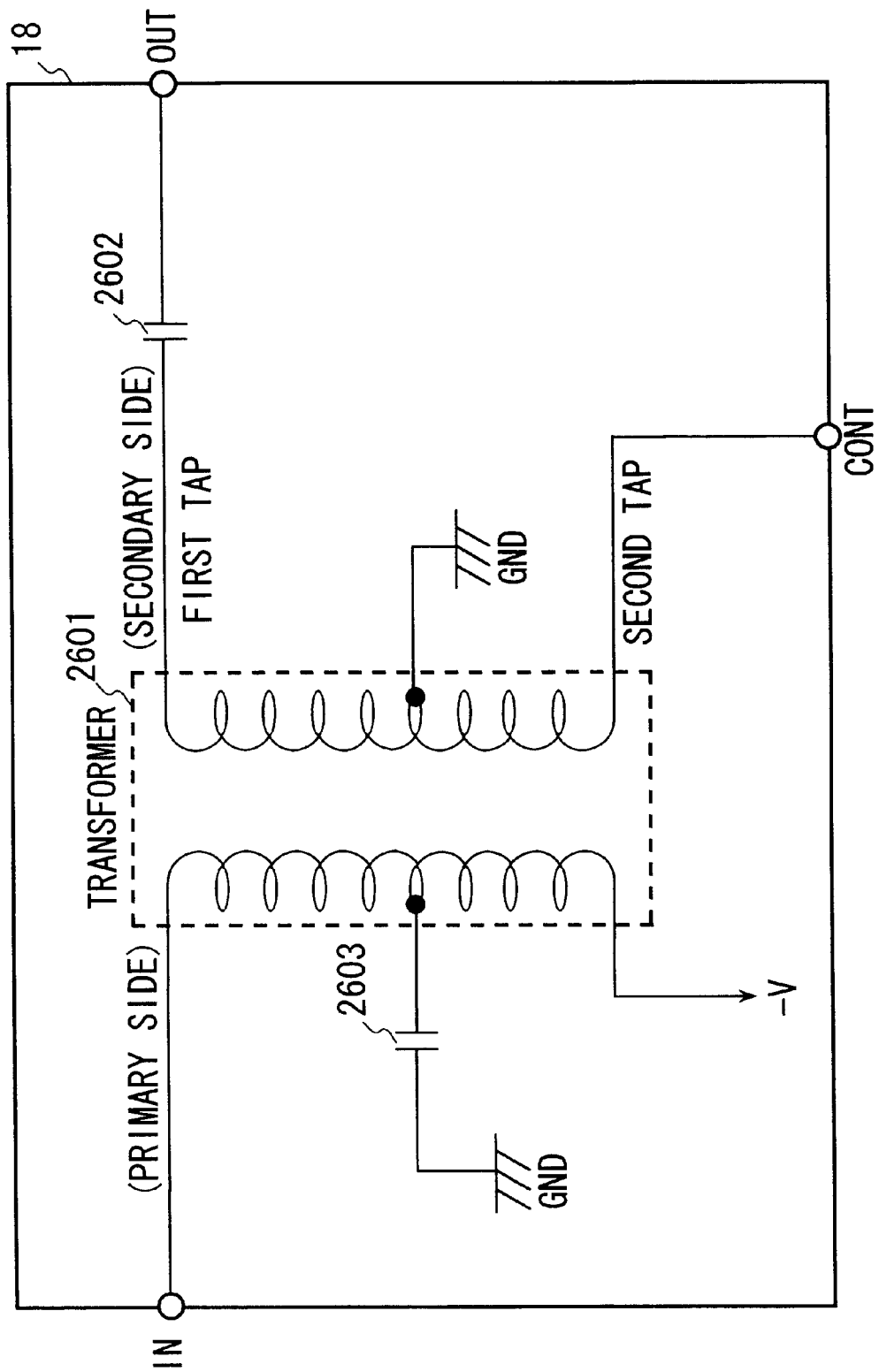
FIG. 26 is a block diagram showing a detailed exemplary configuration of the last-stage ASK modulation circuit 18.

In what follows, the sixth embodiment of the present invention in which an ASK modulator according to the present invention is applied to a wireless communication system in the wireless frequency 5.8 GHz band will be explained in detail with reference to FIGS. 25 and 26. Here, FIG. 25 is a block diagram showing the configuration of this sixth embodiment. FIG. 26 shows in detail configurations of key components used in this embodiment.

The ASK modulator of the sixth embodiment shown in FIG. 25 has a local oscillator 1, a buffer amplifier 2, a power amplification circuit 4, a band-pass filter 5, an antenna terminal 6, a low pass filter 8, a drain modulation circuit 14, and a last-stage ASK modulation circuit 18. The power amplification circuit 4, drain modulation circuit 14, and last-stage ASK modulation circuit 18 form a modulation means 100.

In this fifth embodiment, unlike the first through fourth embodiments, the power amplification unit 4 does not perform ASK modulation. Instead, the power amplification unit 4 amplifies a 5.8 GHz band wireless carrier signal supplied from the local oscillator 1 to a level required for communication and feeds the amplified signal to the last stage ASK modulation circuit 18. The last stage ASK modulation circuit 18 then produces a desired ASK modulated signal.

In FIG. 25, the same reference numerals are assigned to the same components used in the first through fourth embodiments. Hence, only the last stage ASK modulation circuit 18 will be explained in detail in the following.

FIG. 26 shows in detail an exemplary configuration of a last stage ASK modulation circuit 18 in which a modulation transformer that can be operated at high frequencies is used.

The power amplification unit 4 amplifies a 5.8 GHz band wireless carrier signal supplied from the local oscillator 1 to a level required for communication and feeds the amplified signal to the input terminal IN of the last stage ASK modulation circuit 18. The signal is then supplied to the primary side of a modulation transformer 2601.

Meanwhile, the drain modulation circuit 14 supplies a data signal to the second tap terminal of the secondary side of the modulation transformer 2601. As has been explained in the fourth embodiment, the drain modulation circuit 14 containing power amplifiers amplifies the power level of the data signal supplied from the data signal input terminal a via the low pass filter 8 until the power level of the data signal reaches an appropriate level with respect to the power level of the 5.8 GHz band wireless carrier signal amplified by the power amplification circuit 4.

When the modulation transformer 2601 receives the 5.8 GHz band wireless carrier signal on its primary side and the data signal at the second tap terminal of the secondary side, the modulation transformer 2601 synthesizes these two signals. The synthesized signal having a modulated waveform is then produced on the first tap terminal of the secondary side. This waveform is equivalent to the waveform of the ASK modulated signal obtained in the fourth embodiment shown in FIG. 20(D).

Next, the operation of this ASK modulator according to the sixth embodiment will be explained in detail. The signal waveforms obtained in this case will not be shown since they are the same as those obtained in the fourth embodiment.

When the data signal, which has been transformed into a Manchester data signal from the original transmission data, is supplied to the low pass filter 8 via the data input terminal a, the low pass filter 8 smoothes the edge portion of the data signal by removing the high frequency components of the data signal. The low pass filter 8 then supplies the smoothed data signal to the drain modulation circuit 14. The drain modulation circuit 14 then further amplifies the power level of the data signal received from the low pass filter 8 to a power level appropriate with respect to the power level of the 5.8 GHz band wireless carrier signal amplified by the power amplification circuit 4. This further power amplifies data signal is then fed to the last-stage ASK modulation circuit 18.

The last-stage ASK modulation circuit 18 then synthesizes the 5.8 GHz band wireless carrier signal, which has been amplified to a level required for communication by the power amplification circuit 4, with the data signal supplied from the drain modulation circuit 14. The synthesized signal is an ASK modulated signal in the 5.8 GHz band. The last-stage ASK modulation circuit 18 then feeds the synthesized signal to the band-pass filter 5.

The band-pass filter 5 removes unwanted spurious radiation components from the ASK modulated signal output from the last-stage ASK modulation circuit 18, and feeds the resultant ASK modulated signal to an antenna not shown in the drawing via the antenna terminal 6. The ASK modulated signal is then radiated as a radio wave from the antenna.

It should be noted here that the data signal supplied from the drain modulation circuit 14 is superposed on the 5.8 GHz band wireless carrier signal amplified by the power amplification circuit 4. Therefore, when the data signal is a logic "H" signal, the maximum output level of the ASK modulated signal obtained in this case becomes higher than that in the case in which no data signal is supplied to the data input terminal a as shown in FIG. 20(D).

Thus, a low pass filter for removing high frequency components from the given data signal, a drain modulation circuit which further amplifies the power level of the data signal received from the low pass filter to a power level appropriate with respect to the power level of the 5.8 GHz band wireless carrier signal amplified by the power amplification circuit, and a last-stage ASK modulation circuit which synthesizes the 5.8 GHz band wireless carrier signal supplied from the power amplification circuit with the data signal supplied from the drain modulation circuit are installed in the ASK modulator of the sixth embodiment. Therefore, the spread of the spectrum of the ASK modulated signal centered at 5.8 GHz is confined within a ranged determined by the characteristics of the low pass filter. As a result, the frequency band width of the ASK modulated signal is reduced.

(G) EMBODIMENT OF DATA TRANSMITTER-RECEIVER HAVING ASK MODULATOR EXPLAINED SO FAR

Figure 27:
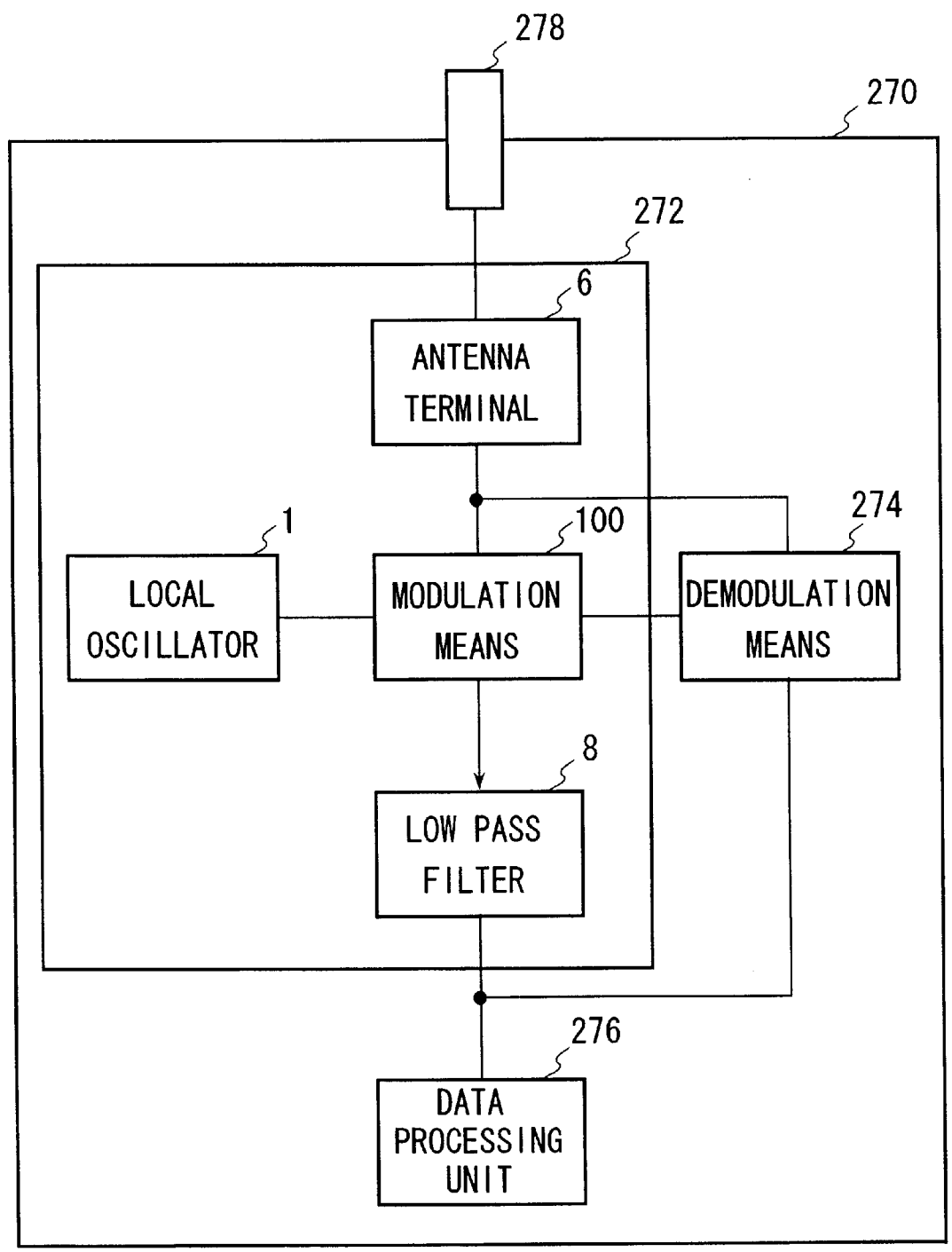
FIG. 27 shows a data transmitter-receiver having an ASK modulator according to the present invention.

FIG. 27 is a block diagram showing the schematic configuration of a data transmitter-receiver 270 having an ASK modulator. This data transmitter-receiver 270 has an ASK modulator 272, a demodulation means 274, a data processing unit 276, and an antenna 278. The ASK modulator 272 has, for example, the structure of the ASK modulator of one of the first through six embodiments. In FIG. 27, a local oscillator 1, a modulation means 100, a low pass filter 8, and an antenna terminal 6 are shown. The demodulation means 274 has a frequency filter, a mixer, and the like, and demodulates a received signal. The data processing unit 276 generates a transmission data signal when the data transmitter-receiver 270 functions as a transmitter, and processes a signal demodulated by the demodulation means 274 when the data transmitter-receiver 270 functions as a receiver.

The operation of the data transmitter-receiver 270 when it transmits a data signal will be explained. The local oscillator 1 generates a carrier signal and feeds the carrier signal to the modulation means 100. The data processing unit 276 generates a transmission data signal and sends the transmission data signal to the low pass filter 8. The low pass filter 8 passes only the low frequency components of the received transmission data signal and feeds the filtered transmission data signal to the modulation means 100. The modulation means 100 generates an ASK modulated signal based on the data signal supplied from the low pass filter 8 and the carrier signal generated by the local oscillator 1. The ASK modulated signal is then sent to the antenna 278 via the antenna terminal 6 and is radiated as a radio wave to outside.

Next, the operation of the data transmitter-receiver 270 when it receives a modulated data signal will be explained. The antenna 278 receives a modulated data signal and sends the modulated data signal to the antenna terminal 6. The antenna terminal 6 then sends the modulated data signal to the demodulation means 274. The demodulation means 274 demodulates the modulated data signal and restores the original signal. The restored data signal is then sent to the data processing unit 276 in which necessary processes are performed.

Thus, the data transmitter-receiver 270 of the present embodiment transmits an ASK modulated signal and receives a modulated signal.

Figure 28:
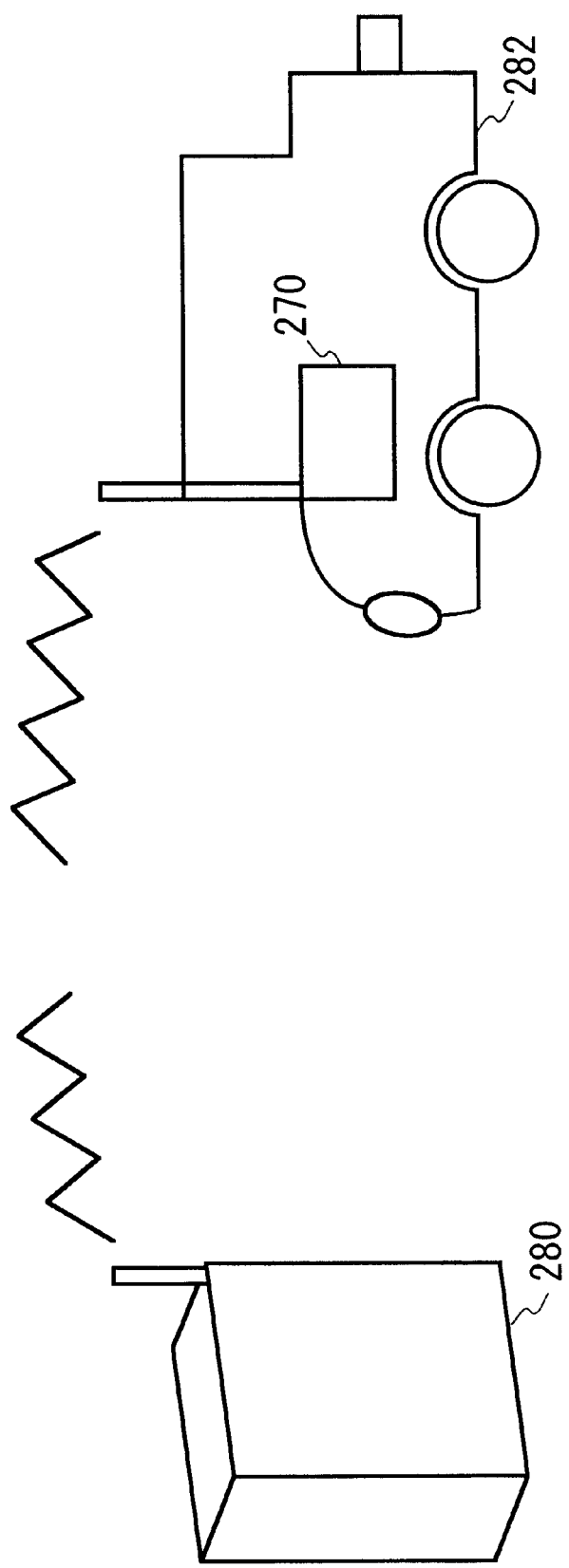
FIG. 28 shows an ETC system in which the ASK modulator shown in FIG. 27 is installed.

FIG. 28 shows an ETC system in which the ASK modulator of the present embodiment shown in FIG. 27 is installed. A wireless beacon 280 installed on the roadside has a data transmitter-receiver 270 not shown in the drawing, and is able to transmit and receive an ASK modulated signal. A vehicle 282 that travels on the road also has a data transmitter-receiver 270, and is able to transmit and receive an ASK modulated signal. The wireless beacon 280 transmits information on its location to the vehicle 282. The vehicle 282 then transmits its ID or the like to the wireless beacon 280. The vehicle 282 and the wireless beacon 280 perform a two-way communication between them so that the toll can be collected at a tollbooth without requiring the vehicle 282 to stop at the tollbooth.

(H) OTHER EMBODIMENTS

The case in which the wireless frequency is 5.8 GHz has been explained so far. However, other cases in which the wireless frequency is not 5.8 GHz can be explained in the same manner.

The ASK modulators of the above-described embodiments have been applied to wireless systems. Needless to say, these ASK modulators can be applied to other systems as well.

In the first embodiment, a voltage-current conversion circuit which converts the data signal into a current signal whose current level is linearly related to the voltage level of the data signal is installed. However, if a modulation unit which changes the amplitude of the wireless carrier signal so that the amplitude of the wireless carrier signal will be linearly related to the voltage level of the data signal is installed instead of the pin diode modulator, the voltage-current conversion circuit need not be installed.

Moreover, in the first embodiment, the case in which the voltage-current conversion circuit 9 produces a data signal whose current level is linearly related to the voltage level of the data signal supplied to the input terminal IN has been explained. However, the case in which the voltage-current conversion circuit 9 produces a data signal whose current level is linearly related to another level (for example, the current level) of the data signal can also be explained in the same manner.

In the second embodiment, a power amplifier for driving the power of the data signal is installed. However, if a modulation unit which changes the amplitude of the wireless carrier signal so that the amplitude of the wireless carrier signal will be linearly related to the amplitude level of the data signal is installed, the double balance mixer 10 need not be installed.

Moreover in the second embodiment, if a double balance mixer having power amplifying bipolar transistors is used, the power amplifier 11 can be eliminated.

In the third embodiment, a gate modulation circuit which converts the voltage level of the data signal into a negative voltage level is installed. However, if the power amplification unit is constructed so as to change the amplitude level of the wireless carrier signal so that the amplitude level of the wireless carrier signal will be linearly related to the amplitude level of the data signal changing the amplification factor in accordance with the amplitude level of the data signal, the gate modulation circuit can be eliminated.

In the fifth embodiment, a drain power source control circuit which generates a power source current signal whose waveform is equivalent to the waveform of the data signal is installed. However, if the power amplification unit is constructed so as to change the amplitude level of the wireless carrier signal so that the amplitude level of the wireless carrier signal will be linearly related to the amplitude level of the data signal changing the amplification factor in accordance with the amplitude level of the data signal, the drain power source control circuit can be eliminated.

According to the first invention, a frequency filter means which passes only the low frequency components of the input signal and a modulation means which changes the envelope of the carrier signal supplied from the oscillation means so that the amplitude level of the carrier signal will be linearly related to the amplitude level of the frequency limited signal supplied from the frequency filter means are installed. As a result, the frequency band spread of the ASK modulated signal is confined within a range determined by the frequency band limited by the filter means, and the frequency band width of the ASK modulated signal is made narrow.

According to the second invention, a frequency filter means for passing only the low frequency components of the input signal, and a power amplification modulation means which changes the envelope of the carrier signal so that the envelope of the carrier signal will be linearly related to the amplitude level of the frequency limited signal by amplifying the carrier signal supplied from the oscillation means to a prescribed power level changing the amplification factor in accordance with the amplitude level of the frequency limited signal supplied from the frequency filter means are installed. Therefore, the frequency band spread of the ASK modulated signal is confined within a range determined by the frequency band limited by the filter means, and the frequency band width of the ASK modulated signal is made narrow.

According to the third invention, a frequency filter means for passing only the low frequency components of the input signal, a superposition power amplification means which amplifies the power level of the frequency limited signal supplied from the frequency filter means to a level at which the frequency limited signal can be superposed on the carrier signal supplied from the power amplification means, and a superposition modulation means, which is installed at the last stage of the power amplification means, for changing the envelope of the carrier signal so that the envelope of the carrier signal will be linearly related to the amplitude level of the frequency limited signal by superposing the carrier signal supplied from the power amplification means onto the frequency limited signal supplied from the superposition power amplification means are installed. Therefore, the frequency band spread of the ASK modulated signal is confined within a range determined by the frequency band limited by the filter means, and the frequency band width of the ASK modulated signal is made narrow.

Although the present invention has been described using its embodiments, the scope of the present invention is not limited to these embodiments. Those skilled in the art can add various modifications and improvements to the embodiments of the present invention. It is clear from the claims that such modified or improved embodiments can be also covered by the scope of the present invention.

What is claimed is:

1. An ASK modulator which receives a digital input signal including a clock signal and generates an amplitude shift keying (ASK) modulated signal in accordance with the logic level of said input signal, comprising:
    an oscillator which generates a carrier signal;
    a frequency filter which passes a frequency-limited signal having a prescribed frequency component of said digital input signal; and
    a modulator which modulates said carrier signal based on said frequency-limited signal and outputs said ASK modulated signal, said ASK modulated signal having a frequency-limited component,
    wherein said modulator comprises a double balance mixer which mixes said carrier signal with said frequency-limited signal and adjusts an amplitude level of said carrier signal so that said amplitude level of said carrier signal will be substantially linearly related with a level of said frequency-limited signal.

2. An ASK modulator as claimed in claim 1, wherein said frequency filter comprises a low pass filter which passes a low frequency component of said input signal.

3. An ASK modulator as claimed in claim 1, wherein said double balance mixer comprises a transformer and a diode.

4. An ASK modulator which receives an input signal having a logic level and generates an amplitude shift keying (ASK) modulated signal in accordance with the logic level of said input signal, comprising:
    an oscillator which generates a carrier signal, said carrier signal having an amplitude level;
    a frequency filter which passes a frequency-limited signal having a prescribed frequency component of said input signal, said frequency-limited signal having a voltage level; and
    a modulator which modulates said carrier signal based on said frequency-limited signal and outputs said ASK modulated signal, said ASK modulated signal having a limited frequency component,
    wherein said modulator includes:
        a power amplifier which amplifies said amplitude level of said carrier signal to a prescribed level based on said voltage level of said frequency-limited signal, and
        a negative voltage converter which converts said voltage level of said frequency-limited signal to a negative level to produce a converted frequency-limited signal and supplies said converted frequency-limited signal to said power amplifier.

5. An ASK modulator which receives a digital input signal including a clock signal and generates an amplitude shift keying (ASK) modulated signal in accordance with the logic level of said input signal, comprising:
    an oscillator which generates a carrier signal;
    a frequency filter which passes a frequency-limited signal having a prescribed frequency component of said digital input signal; and
    a modulator which modulates said carrier signal based on said frequency-limited signal and outputs said ASK modulated signal, said ASK modulated signal having a frequency-limited component, said modulator comprising
        a power amplification unit which amplifies said carrier signal to a prescribed power level to produce an amplified carrier signal and superposes said amplified carrier signal on said frequency-limited signal, and
        a superposition power amplifier which amplifies said frequency-limited signal to enable said frequency-limited signal to be superposed on said amplified carrier signal that has been amplified to said prescribed power level by said power amplification unit.

6. An ASK modulator, which receives a digital input signal having a logic level and generates an amplitude shift keying (ASK) modulated signal in accordance with the logic level of said digital input signal, said digital input signal including clock information, comprising:
    an oscillator which generates a carrier signal;
    a frequency filter which passes a frequency-limited signal having a prescribed frequency component of said digital input signal; and
    modulator which modulates said carrier signal based on said frequency-limited signal and outputs said ASK modulated signal, said ASK modulated signal having a limited frequency component, wherein said modulator includes:
- a power amplification unit which amplifies said carrier signal to a prescribed power level,
- a superposition power amplifier which amplifies said frequency-limited signal to enable said frequency-limited signal to be superposed on said carrier signal that has been amplified to said prescribed power level, and
- a last-stage ASK modulation circuit which generates said ASK modulated signal by superposing said carrier signal amplified by said power amplification unit on said frequency-limited signal amplified by said superposition power amplifier.

7. An ASK modulator as claimed in claim 6, wherein said carrier signal has a level, and wherein said carrier signal has an envelope that is adjusted by said modulator so that said envelope of said carrier signal will be substantially linearly related with said level of said carrier signal.

8. An ASK modulator as claimed in claim 1, wherein the digital input signal is a serial signal and the logic levels thereof are high and low, and wherein said frequency-limited signal is a smoothed version of said digital input signal, with said frequency-limited signal having maxima which correspond to said high logic level of said digital input signal and minima which correspond to said low logic level of said digital input signal.

* * * * *